US012620536B2

(12) United States Patent
Park et al.

(10) Patent No.: US 12,620,536 B2
(45) Date of Patent: May 5, 2026

(54) CIRCUIT BREAKING UNIT AND AIR CIRCUIT BREAKER INCLUDING SAME

(71) Applicant: LS ELECTRIC CO., LTD., Anyang-si (KR)

(72) Inventors: Yong Ik Park, Anyang-si (KR); Han Baek Chung, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 272 days.

(21) Appl. No.: 18/285,921

(22) PCT Filed: Apr. 29, 2022

(86) PCT No.: PCT/KR2022/006184

§ 371 (c)(1),
(2) Date: Oct. 6, 2023

(87) PCT Pub. No.: WO2022/240033

PCT Pub. Date: Nov. 17, 2022

(65) Prior Publication Data

US 2024/0186084 A1 Jun. 6, 2024

(30) Foreign Application Priority Data

May 14, 2021 (KR) ........................ 10-2021-0062891
May 14, 2021 (KR) ........................ 10-2021-0062894

(51) Int. Cl.
*H01H 33/18* (2006.01)

(52) U.S. Cl.
CPC .................................. *H01H 33/18* (2013.01)

(58) Field of Classification Search
CPC ........ H01H 9/302; H01H 9/346; H01H 9/443; H01H 9/44; H01H 9/46; H01H 9/383;
(Continued)

(56) References Cited

U.S. PATENT DOCUMENTS 3,585,329 A * 6/1971 Walker ................... H01H 9/383 218/15
6,281,459 B1 * 8/2001 Munsch ............... H01H 77/108 335/147

(Continued)

FOREIGN PATENT DOCUMENTS

CN 207731889 U 8/2018
EP 2820665 B1 7/2016

(Continued)

OTHER PUBLICATIONS

International Search Report for related International Application No. PCT/KR2022/006184; action dated Nov. 17, 2022; (3 pages).

(Continued)

*Primary Examiner* — William A Bolton
(74) *Attorney, Agent, or Firm* — K&L Gates LLP

(57) ABSTRACT

A circuit breaking unit includes a fixed contact, a movable contact in contact with or spaced apart from the fixed contact, a fixed contact terminal having the fixed contact disposed at a lower end thereof and extending upward, a movable contact terminal on which the movable contact is disposed and configured such that the movable contact moves in a direction toward the fixed contact or in a direction away from the fixed contact, and a low runner disposed extending upward from the fixed contact, one end thereof coupled to the fixed contact terminal, and the other end thereof spaced apart from the fixed contact terminal, wherein a magnet unit or a U assembly is disposed between the low runner and the fixed contact terminal.

30 Claims, 33 Drawing Sheets

(58) Field of Classification Search
CPC .. H01H 2009/365; H01H 33/18; H01H 33/08; H01H 31/02
USPC .. 218/30, 15, 18, 20–23, 26, 34, 36, 38, 40, 218/43
See application file for complete search history.

(56) References Cited

U.S. PATENT DOCUMENTS

| | | | | |
|---|---|---|---|---|
| 9,653,237 | B1 * | 5/2017 | Zhou | H01H 77/108 |
| 9,673,004 | B1 * | 6/2017 | Ruempler | H01H 9/36 |
| 9,715,979 | B2 * | 7/2017 | Bresciani | H01H 33/10 |
| 2007/0095794 | A1 * | 5/2007 | Zindler | H01H 9/46 218/151 |
| 2008/0067042 | A1 | 3/2008 | Shea et al. | |
| 2013/0284702 | A1 * | 10/2013 | Hamada | H01H 9/346 218/26 |
| 2015/0028973 | A1 * | 1/2015 | Cardwell | H01H 3/26 310/15 |
| 2019/0157028 | A1 * | 5/2019 | Rival | H01H 9/342 |
| 2021/0020397 | A1 * | 1/2021 | Oh | H01H 73/18 |

FOREIGN PATENT DOCUMENTS

| | | | |
|---|---|---|---|
| EP | 3232457 | A1 | 10/2017 |
| EP | 3384512 | B1 | 1/2020 |
| EP | 4339980 | A1 | 3/2024 |
| JP | 2016201171 | A | 12/2016 |
| JP | 6419515 | B2 | 11/2018 |
| KR | 101352912 | B1 | 1/2014 |
| KR | 20140012034 | A | 1/2014 |
| KR | 20140091934 | A | 7/2014 |
| KR | 1020140110945 | A | 9/2014 |

OTHER PUBLICATIONS

Written Opinion for related International Application No. PCT/KR2022/006184; action dated Nov. 17, 2022; (5 pages).
Office Action for related Korean Application No. 10-2021-0062891; action dated Sep. 26, 2023; (5 pages).
Office Action for related Korean Application No. 10-2021-0062895; action dated Sep. 27, 2023; (4 pages).
Extended European Search Report for related European Application No. 22807681.6; action dated May 23, 2025; (11 pages).

* cited by examiner (a)
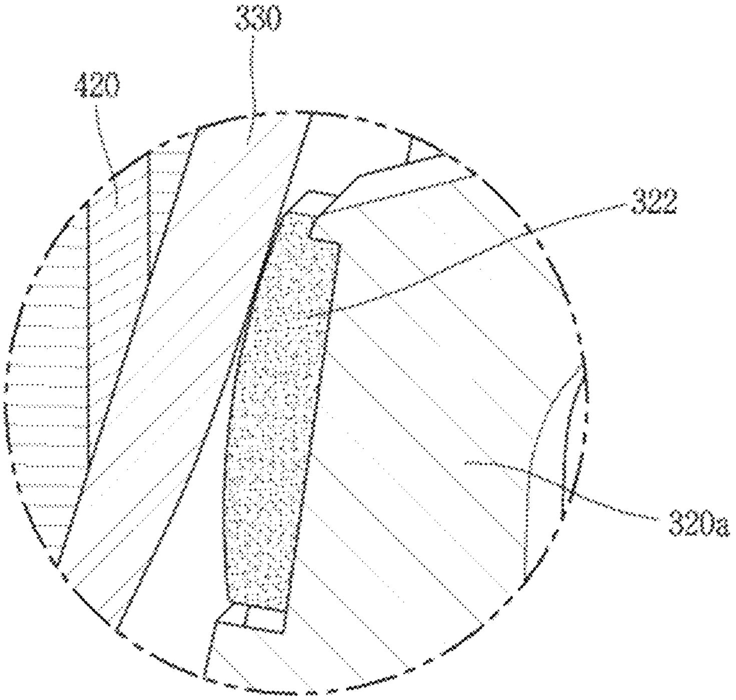
FIG. 18
(b)
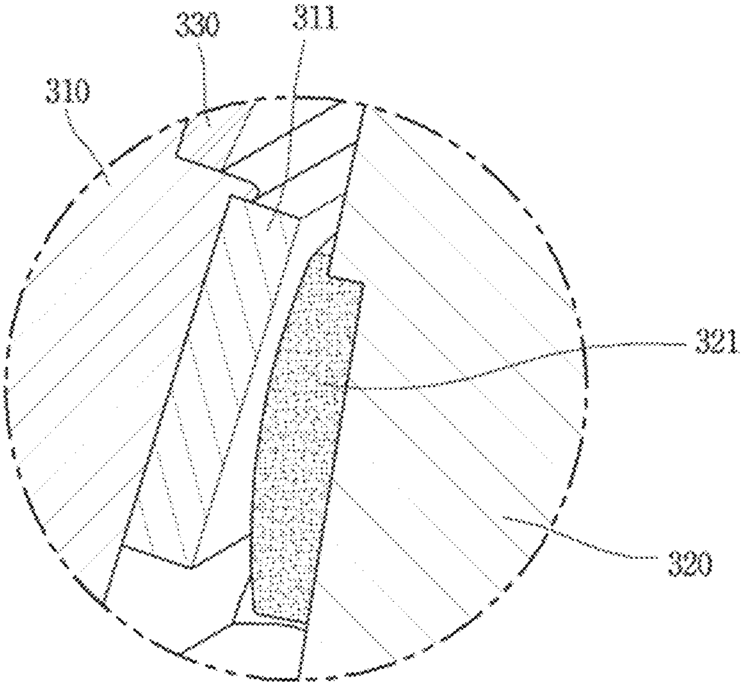

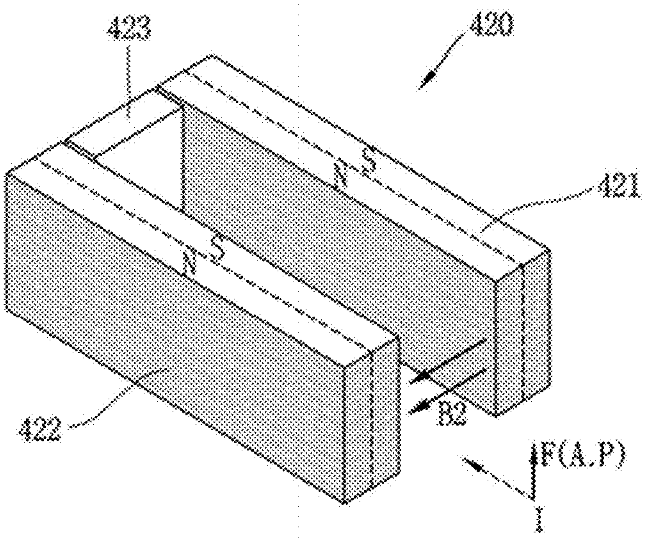
(a)
FIG. 22
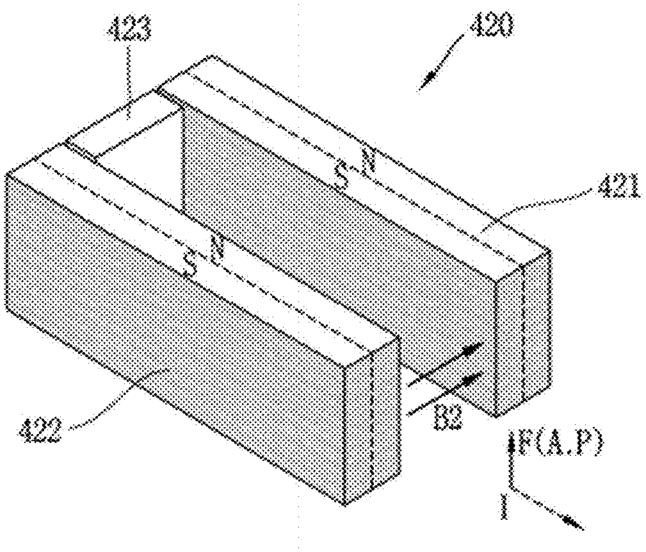
(b)

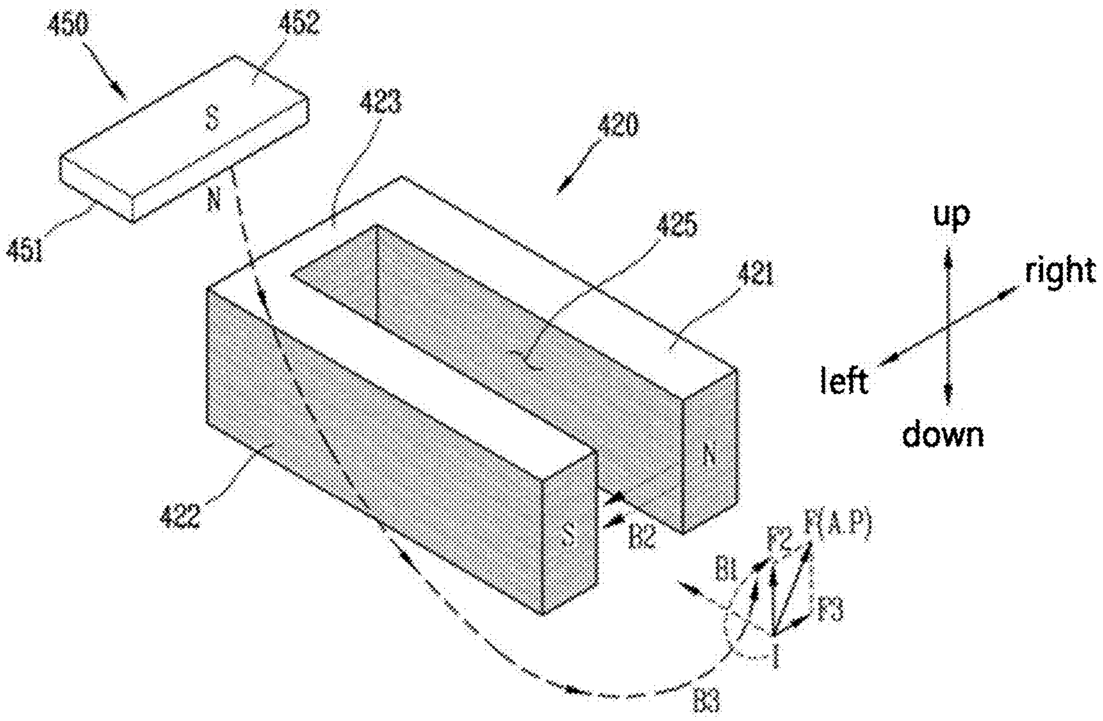
(a)
FIG. 31
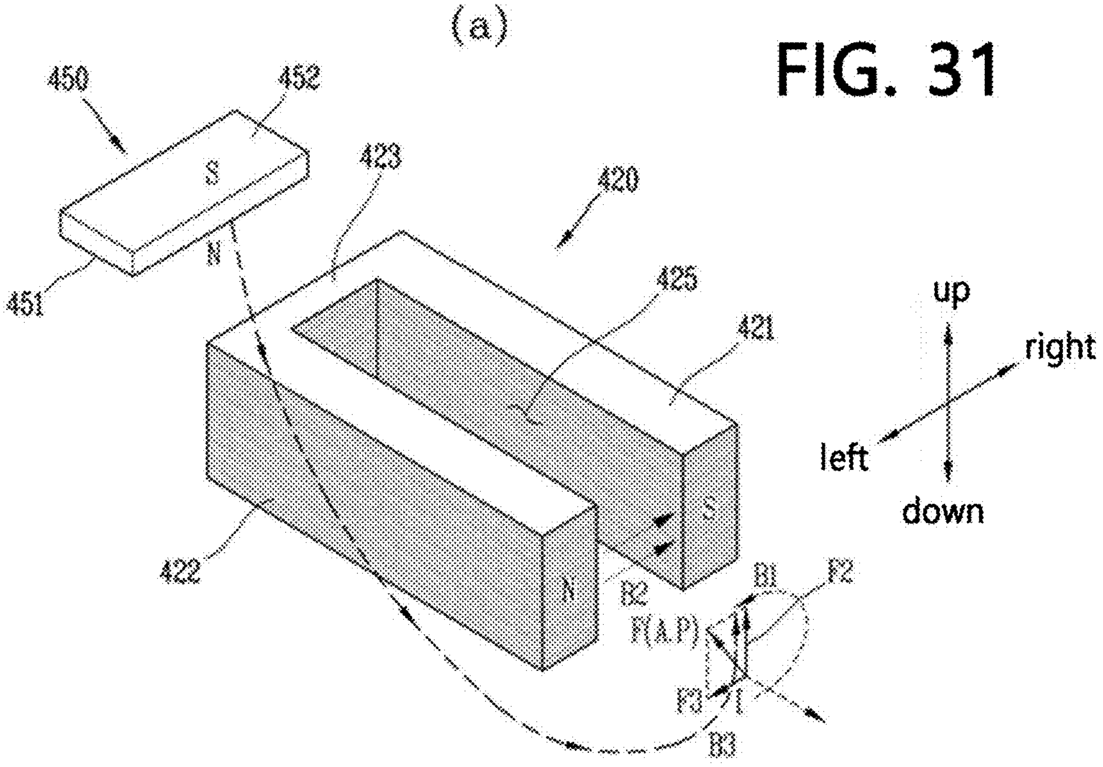

CIRCUIT BREAKING UNIT AND AIR CIRCUIT BREAKER INCLUDING SAME

CROSS-REFERENCE TO RELATED APPLICATIONS

The present application is a National Stage of International Application No. PCT/KR2022/006184 filed on Apr. 29, 2022, which claims priority to and the benefit of Korean Utility Model Application No. 10-2021-0062891, filed May 14, 2021, and Korean Utility Model Application No. 10-2021-0062894, filed May 14, 2021, the disclosures of which are incorporated herein by reference in its entirety.

FIELD

The present disclosure relates to a circuit breaking unit and an air circuit breaker including the same, and more particularly, to a circuit breaking unit capable of effectively extinguishing an arc generated by breaking an electric current and an air circuit breaker including the same.

BACKGROUND

A circuit breaker refers to a device capable of allowing or blocking energization with the outside by contacting and separating fixed contacts and movable contacts. A fixed contact and a movable contact provided in the circuit breaker are respectively connected energizably to an external power source or load.

The movable contact is movably provided in the circuit breaker. The movable contact can be moved towards or away from the fixed contact. When the movable contact and the fixed contact come into contact to each other, the circuit breaker may be energizably connected to an external power source or load.

When an overcurrent or abnormal current flows in the circuit breaker, the movable contact and the fixed contact in contact are spaced apart from each other. At this time, the current energized between the movable contact and the fixed contact does not immediately disappear, but changes into an arc form and extends along the movable contact.

An arc can be defined as a flow of electrons at high temperature and high pressure. Therefore, when the generated arc stays in the inner space of the circuit breaker for a long time, there is a concern that each component of the circuit breaker may be damaged. In addition, when the arc is discharged to the outside of the circuit breaker without a separate treatment process, there is a risk of injury to the user.

Accordingly, circuit breakers are generally provided with an extinguishing device for extinguishing and discharging an arc. The generated arc passes through the extinguishing device, the arc pressure is increased, the moving speed is increased, and it is cooled at the same time and can be discharged to the outside.

Therefore, the generated arc must be quickly guided to an arc extinguishing device.

However, in the case of a direct current air circuit breaker in which a small current flows among DC air breakers, the power of the generated arc is relatively weak. In addition, in the case of direct current, because zero point does not exist in the current, there is a problem in that arc extinguishing is more difficult than that of alternating current.

In particular, since the power of the arc generated inside the DC air circuit breaker is relatively weak when a small current is broken, there is a problem in that the arc generated after the break is not moved to the grid of the arc extinguishing unit. The arc that has not been extinguished in this way stays adjacent to the movable contact and the fixed contact, causing problems such as melting the contact.

Therefore, it is necessary to consider effectively extinguishing the arc generated when the small current is broken in the DC air circuit breaker.

SUMMARY

The present disclosure is directed to providing a circuit breaking unit having a structure capable of solving the above problems and an air circuit breaker including the same.

First, the present disclosure is directed to providing a circuit breaking unit having a structure capable of quickly extinguishing and moving a generated arc and an air circuit breaker including the same.

In addition, the present disclosure is directed to providing an arc extinguishing unit having a structure in which an arc generated when a small current is broken in a direct current air circuit breaker can quickly move to a grid and be extinguished, and an air circuit breaker including the same.

In addition, the present disclosure is directed to providing a circuit breaking unit having a structure in which a magnet forming a magnetic field associated with an arc movement path is not damaged by an arc, and an air circuit breaker including the same.

In addition, the present disclosure is directed to providing a circuit breaking unit having a structure that does not require excessive design changes in order to have a magnet that forms a magnetic field associated with an arc movement path, and an air circuit breaker including the same.

In addition, the present disclosure is directed to providing a circuit breaking unit having a structure in which even when a magnet forming a magnetic field associated with an arc movement path is provided, a space occupied by the magnetic body is not excessively increased, and an air circuit breaker including the same.

In addition, the present disclosure is directed to providing a circuit breaking unit having a structure in which a magnetic field formed by each magnet can be strengthened when a plurality of magnets forming a magnetic field associated with an arc movement path, and an air circuit breaker including the same.

In addition, the present disclosure is directed to providing a circuit breaking unit having a structure in which an arc extinguishing path of a generated arc can be secured even when a magnet is provided, and an air circuit breaker including the same.

In order to achieve the above objects, the present disclosure provides a circuit breaking unit, including: a fixed contact; a movable contact that is in contact with or spaced apart from the fixed contact; a fixed contact terminal having the fixed contact disposed at a lower end thereof and extending upward; a movable contact terminal on which the movable contact is disposed and configured such that the movable contact moves in a direction toward the fixed contact or in a direction away from the fixed contact; a low runner disposed extending upward from the fixed contact, one end thereof coupled to the fixed contact terminal, and the other end thereof spaced apart from the fixed contact terminal; and a U assembly disposed between the low runner and the fixed contact terminal, extending away from the fixed contact terminal and extending toward the movable contact, wherein the U assembly is formed to extend to opposite sides so that when an arc is generated, the pressure applied to the arc is increased.

In addition, the U assembly may include a holder inserted between the low runner and the fixed contact terminal, having a space formed therein, and protruding from both sides of the low runner; a U magnetic body stored in the inner space of the holder and made of a magnetic body; and a fixing part coupled to the holder and the fixed contact terminal at an upper side of the holder so that the holder is not separated from the fixed contact terminal and the U magnetic body is not separated from the inner space.

In addition, the U magnetic body may include a magnet unit disposed to be extending from the fixed contact terminal between a protruding contact and an arc extinguishing unit disposed above the protruding contact, and disposed to face each other; and an insulator interposed between the low runner and the fixed contact terminal and disposed between the magnet unit.

In addition, the magnet unit may be disposed such that surfaces facing each other have different polarities.

In addition, the magnet unit may be disposed so that an arc generated during a trip mechanism of the movable contact and the fixed contact is subjected to an electromagnetic force upward.

In addition, the U magnetic body may include a first magnetic body disposed to be extending from the fixed contact terminal between a protruding contact and an arc extinguishing unit disposed above the protruding contact; a second magnetic body spaced apart from the first magnetic body and disposed to face the first magnetic body; and a third magnetic body integrally formed with the first magnetic body and the second magnetic body and interposed between the low runner and the fixed contact terminal.

In addition, the first magnetic body, the second magnetic body, and the third magnetic body may be formed by stacking magnetic bodies.

In addition, the first magnetic body and the second magnetic body may be configured to form an induced magnetic field by a generated arc, and the induced magnetic field may be formed so that a generated arc is subjected to an electromagnetic force upward.

In addition, the holder may include a gassing material that generates molecules that extinguish an arc when heat generated by the arc is applied.

In addition, the circuit breaking unit may further include a protruding contact disposed extending upward from the movable contact, energized when in contact with the low runner, and spaced apart from the low runner when the movable contact is tripped.

In addition, the protruding contact may extend upward so as to overlap at least a portion of a side plate of an arc extinguishing unit disposed above the protruding contact.

In addition, the U assembly may extend between the arc extinguishing unit and the protruding contact from both sides of the low runner.

In addition, the U assembly may extend to surround a side surface of the protruding contact when the protruding contact is disposed in a trip state.

In addition, an air gap, which is a separation space, may be formed between the U assembly and the protruding contact.

In addition, in order to achieve the above objects, the present disclosure provides a circuit breaking unit, including: a fixed contact; a movable contact that is in contact with or spaced apart from the fixed contact; a fixed contact terminal having the fixed contact disposed at a lower end thereof and extending upward; a movable contact terminal on which the movable contact is disposed and configured such that the movable contact moves in a direction toward the fixed contact or in a direction away from the fixed contact; a low runner disposed extending upward from the fixed contact, one end thereof coupled to the fixed contact terminal, and the other end thereof spaced apart from the fixed contact terminal; and a magnet unit disposed between the low runner and the fixed contact terminal and forming a magnetic field so that a generated arc is subjected to an electromagnetic force to the left or right.

In addition, the magnet unit may include a first surface magnetized to the N pole; and a second surface magnetized to the S pole, and the first surface of the magnet unit may be disposed in a direction toward the fixed contact, and the second surface may be disposed in a direction opposite to the first surface.

In addition, the magnet unit may include a first surface magnetized to the N pole; and a second surface magnetized to the S pole, and the second surface of the magnet unit may be disposed in a direction toward the fixed contact, and the first surface may be disposed in a direction opposite to the second surface.

In addition, the circuit breaking unit may further include a U assembly disposed between the low runner and the fixed contact terminal, extending away from the fixed contact terminal and extending toward the movable contact, and the U assembly may be disposed under the magnet unit.

In addition, the U assembly may be formed to extend to opposite sides of the low runner so that when an arc is generated, the pressure applied to the arc is increased.

In addition, the U assembly may include a holder inserted between the low runner and the fixed contact terminal, having a space formed therein, and protruding from both sides of the low runner; a U magnetic body stored in the inner space of the holder and made of a magnetic body; and a fixing part coupled to the holder and the fixed contact terminal at an upper side of the holder so that the holder is not separated from the fixed contact terminal and the U magnetic body is not separated from the inner space.

In addition, the magnet unit may be disposed inside the fixing part, and the low runner may be disposed on the front surface of the magnet unit, and the fixed contact terminal may be disposed on the rear surface of the magnet unit.

In addition, the U magnetic body may include a first magnetic body disposed to be extending from the fixed contact terminal between a protruding contact and an arc extinguishing unit disposed above the protruding contact; a second magnetic body spaced apart from the first magnetic body and disposed to face the first magnetic body; and a third magnetic body integrally formed with the first magnetic body and the second magnetic body and interposed between the low runner and the fixed contact terminal.

In addition, the first magnetic body, the second magnetic body, and the third magnetic body may be formed by stacking magnetic bodies.

In addition, the first magnetic body and the second magnetic body may be configured to form an induced magnetic field by a generated arc, and the induced magnetic field may be formed so that a generated arc is subjected to an electromagnetic force upward.

In addition, the magnet unit may be disposed above the third magnetic body.

In addition, in order to achieve the above objects, the present disclosure provides an air circuit breaker, including: a cover; an arc extinguishing unit disposed within the cover and comprising a plurality of side plates and a grid coupled between the side plates; and a circuit breaking unit disposed adjacent to the arc extinguishing unit, wherein the circuit breaking unit includes a fixed contact; a movable contact that is in contact with or spaced apart from the fixed contact; a fixed contact terminal having the fixed contact disposed at a lower end thereof and extending upward; a movable contact terminal on which the movable contact is disposed and configured such that the movable contact moves in a direction toward the fixed contact or in a direction away from the fixed contact; a low runner disposed extending upward from the fixed contact, one end thereof coupled to the fixed contact terminal, and the other end thereof spaced apart from the fixed contact terminal; and a U assembly disposed between the low runner and the fixed contact terminal, extending away from the fixed contact terminal and extending toward the movable contact, wherein the U assembly is formed to extend to opposite sides so that when an arc is generated, the pressure applied to the arc is increased.

In addition, the grid may include a grid leg that extends from at least one end in the width direction and extends downward to surround the outside of the U assembly.

In addition, in order to achieve the above objects, the present disclosure provides an air circuit breaker, including: a cover; an arc extinguishing unit disposed within the cover and comprising a plurality of side plates and a grid coupled between the side plates; and a circuit breaking unit disposed adjacent to the arc extinguishing unit, wherein the circuit breaking unit includes a fixed contact; a movable contact that is in contact with or spaced apart from the fixed contact; a fixed contact terminal having the fixed contact disposed at a lower end thereof and extending upward; a movable contact terminal on which the movable contact is disposed and configured such that the movable contact moves in a direction toward the fixed contact or in a direction away from the fixed contact; a low runner disposed extending upward from the fixed contact, one end thereof coupled to the fixed contact terminal, and the other end thereof spaced apart from the fixed contact terminal; and a magnet unit disposed between the low runner and the fixed contact terminal and forming a magnetic field so that a generated arc is subjected to an electromagnetic force to the left or right.

In addition, the magnet unit may be disposed to overlap at least a portion of the grid.

According to embodiments of the present disclosure, the following effects can be achieved.

According to an embodiment of the present disclosure, since the electromagnetic force received by the arc due to the magnetic field formed by the U magnetic body is applied to the arc in a direction directed toward the grid of the arc extinguishing unit regardless of the current flow direction of the arc, there is an advantage in that it is possible to quickly extinguish the arc regardless of the current flow direction of the arc.

In addition, according to an embodiment of the present disclosure, an arc-guided path A.P, which is to move the arc in a left or right direction depending on the current flow of the arc, is formed by a magnetic field formed by the magnet unit, so that the arc can be more quickly applied to the grid of the arc extinguishing unit.

In addition, the present disclosure forms an arc-guided path A.P that guides an arc in an upper left or upper right direction with net electromagnetic force by a U magnetic body and a magnet unit, so that the arc can be quickly applied to the grid and extinguished regardless of the flow of current of the arc.

In addition, the present disclosure provides a protruding contact and a low runner that are in contact with each other in a state in which a fixed contact and a movable contact are spaced apart in the first state of the trip state, and a protruding contact and a low runner that are spaced apart in the second state, and thus generates an arc closer to a grid when a small current breaking occurs in a DC air circuit breaker. Accordingly, there is an advantage in that the generated arc is more easily applied and extinguished through the grid.

Since the grid leg extends downward along the side plate, it becomes closer physically to the arc generated in the arc-generation area A.A, and thus, the arc can be easily applied. Accordingly, the arc can be extinguished quickly.

In addition, when the grid leg has a protruding contact, an air gap can be formed. Since the air gap increases the pressure in the arc-generation area, the generated arc can be subjected to a rising force. Accordingly, the arc can be more easily applied to the grid or the grid leg and extinguished quickly.

In addition, a magnetic field can be induced in the grid leg by an arc generated between the protruding contact and the low runner. At this time, the arc may receive an electromagnetic force in an upward direction by the induced magnetic field. Accordingly, the arc can be more easily applied to the grid.

In addition, the U magnetic body of the air circuit breaker according to an embodiment of the present disclosure forms a magnetic field induced to receive an electromagnetic force toward the arc extinguishing unit regardless of the current direction of the arc, and thus, there is an advantage in that the arc can always be guided toward the arc extinguishing unit regardless of the direction of the DC current connected to the air circuit breaker.

In addition, according to the present disclosure, an air gap can be formed between the protruding contact and the U assembly. Since the air gap increases the pressure in the arc-generation area, the generated arc can be subjected to a rising force. Accordingly, the arc can be more easily applied to the grid or the grid leg and extinguished quickly.

BRIEF DESCRIPTION OF THE DRAWINGS

FIG. 18 is a partially enlarged view illustrating a state in which a protruding contact and a low runner, and a fixed contact and a movable contact of the circuit breaking unit and the arc extinguishing unit shown in FIG. 17 are brought into contact with each other or separated from each other in a first state of a trip state.

FIG. 22 is a diagram for explaining a magnetic field formed by a U magnetic body, and an electromagnetic force received by the arc due to the magnetic field of the U magnetic body, according to an exemplary embodiment of the present disclosure.

FIGS. 31 to 33 are conceptual views of a magnet unit, a magnetic field of a U magnetic body, and an arc-guided path A.P of an arc according to another exemplary embodiment of the present disclosure.

DETAILED DESCRIPTION

Hereinafter, a circuit breaking unit and an air circuit breaker including the same according to an embodiment of the present disclosure will be described in detail with reference to the accompanying drawings.

In the following description, in order to clarify the features of the present disclosure, descriptions of some components may be omitted.

1. Term Definition

The term "energization" used in the following description means that a current or an electrical signal is transmitted between one or more members.

The term "magnet" used in the following description refers to any object capable of magnetizing a magnetic body or generating a magnetic field. In an embodiment, the magnet may be provided as a permanent magnet or an electromagnet.

The term "air circuit breaker" used in the following description refers to a circuit breaker configured to extinguish an arc using air or compressed air. It is assumed that each configuration described below is applied to an air circuit breaker.

However, each configuration described below may also be applied to an air-blast circuit breaker, a compressed air circuit breaker, a gas circuit breaker, an oil circuit breaker, a vacuum circuit breaker, and the like.

The term "magnetic field (M.F)" used in the following description means a magnetic field formed by a magnet. Alternatively, it means a magnetic field formed by a plurality of magnets disposed adjacent to each other. That is, the magnetic field (M.F) means a magnetic field formed by one magnet or a plurality of magnets.

The term "magnetic field area (M.F.A)" means an area of a magnetic field formed by a magnet or the like. In particular, it means a place where a magnetic field formed by a magnet or a magnetized magnetic body affects a section where an arc is generated.

The "arc-generation area (A.A)" means an area where an arc is generated. It means an area where arcing is likely to occur when a movable contact and a fixed contact are spaced apart, and in particular, it means an area where arcing is likely to occur when a protruding contact and a low runner are spaced apart in case there is a protruding contact.

The "arc-guided path (A.P)" means a direction of an electromagnetic force received by an arc generated by a magnet unit according to an embodiment of the present disclosure by a Lorentz force. The path of the arc may be guided by the electromagnetic force generated by the Lorentz force.

Figure 1:
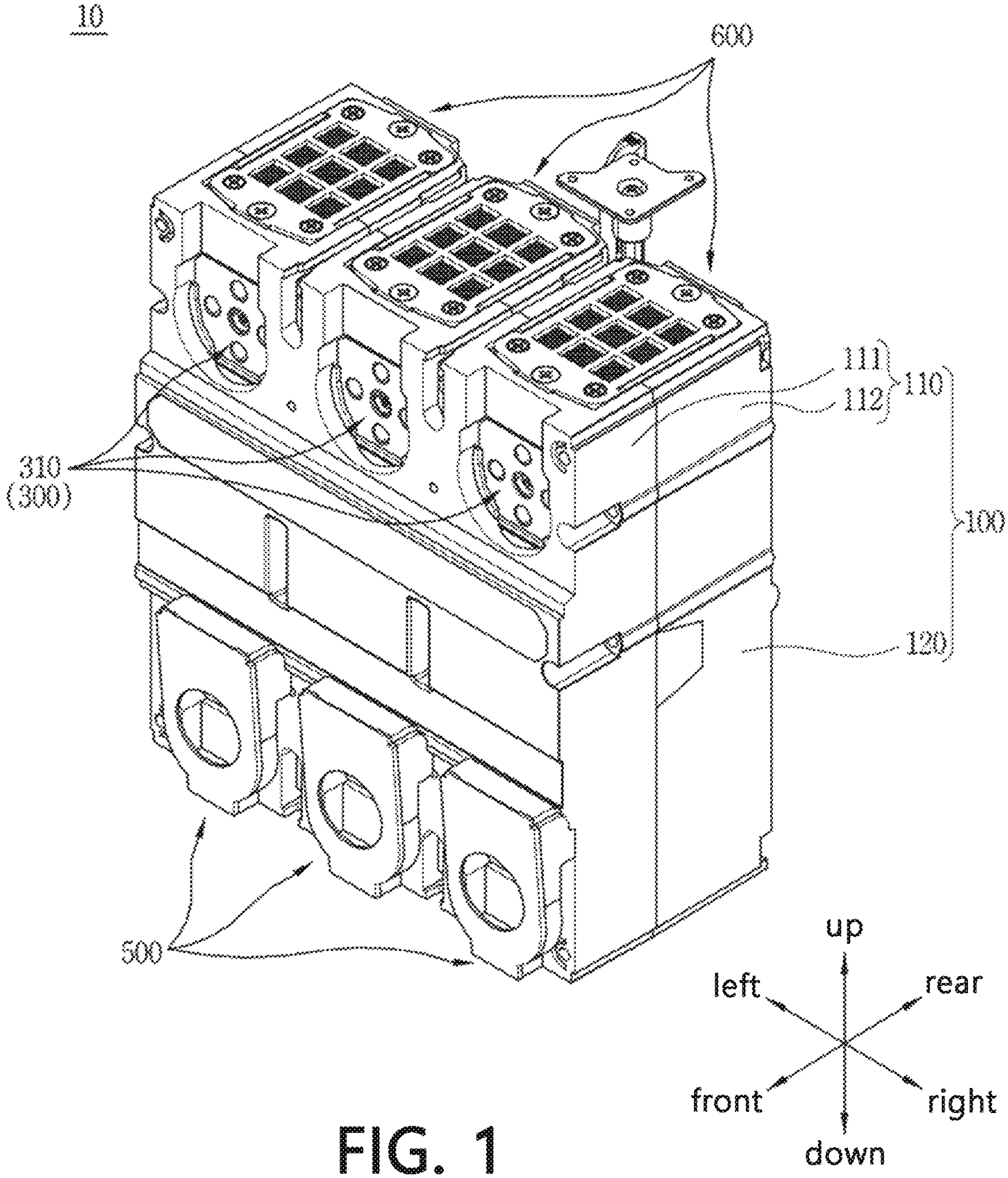
FIG. 1 is a perspective view of an air circuit breaker according to an exemplary embodiment of the present disclosure.
Figure 2:
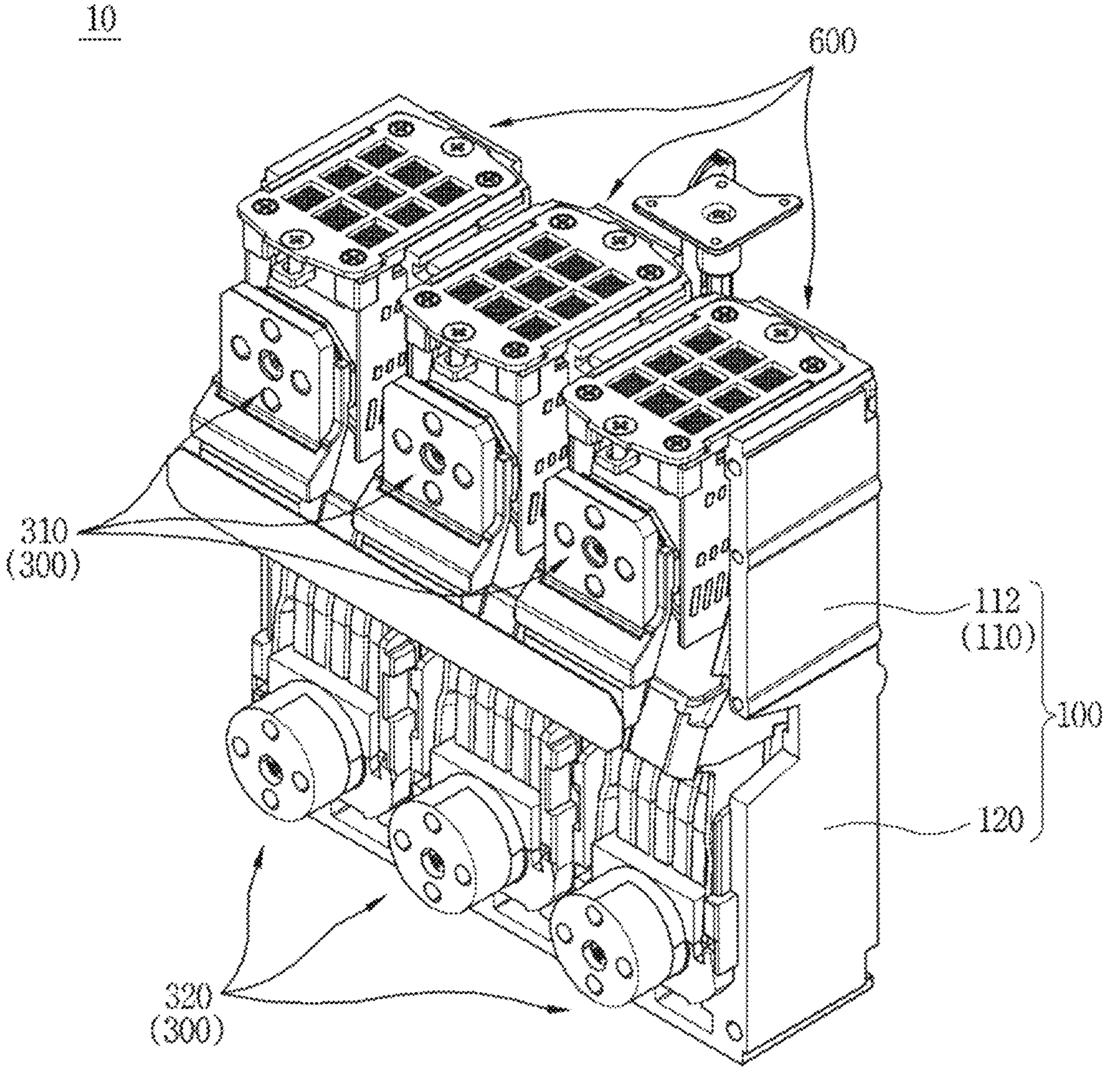
FIG. 2 is a perspective view illustrating a state in which a rear cover is removed from the air circuit breaker of FIG. 1.
Figure 3:
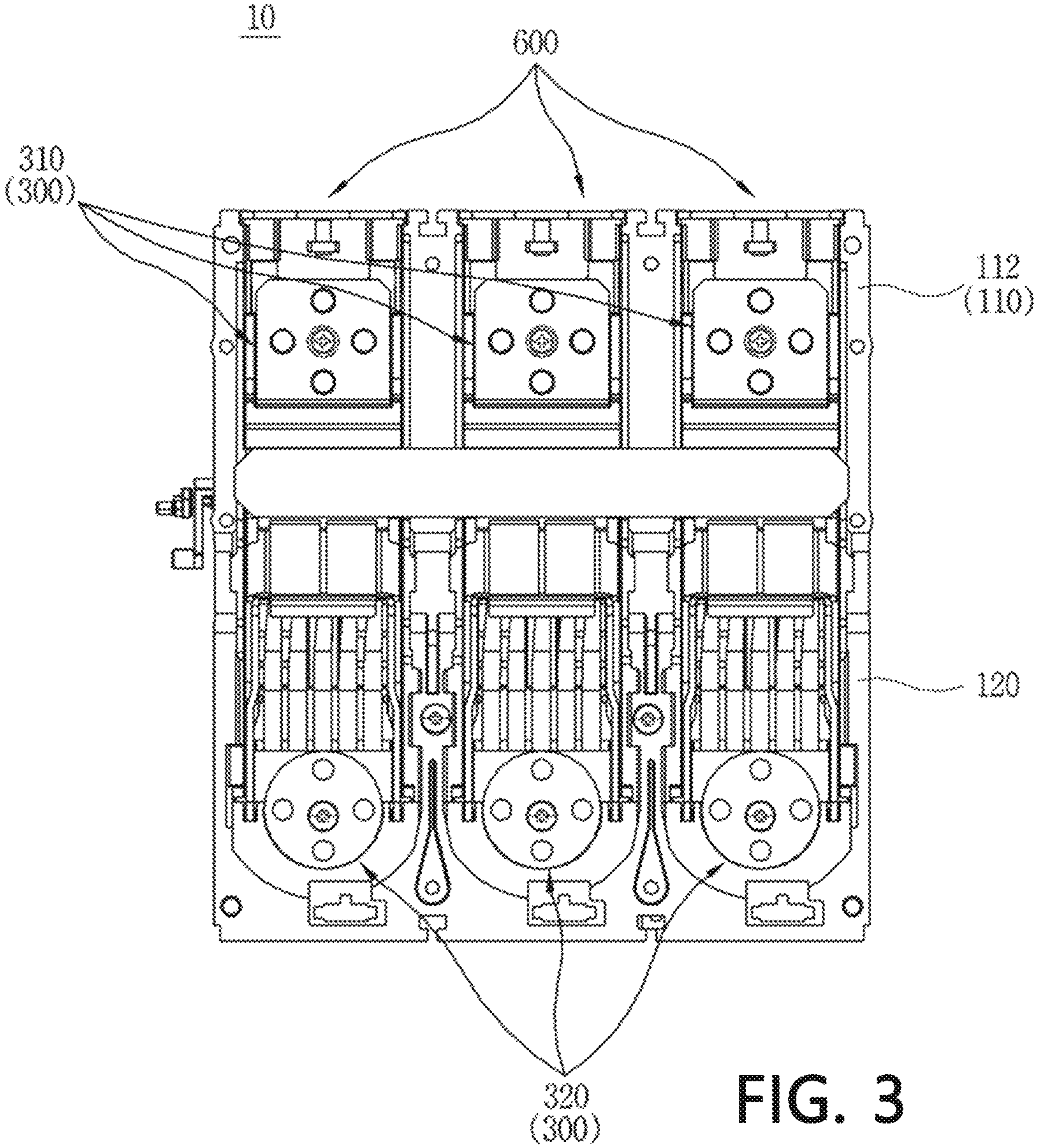
FIG. 3 is a front view illustrating a state in which a rear cover is removed from the air circuit breaker of FIG. 1.
Figure 4:
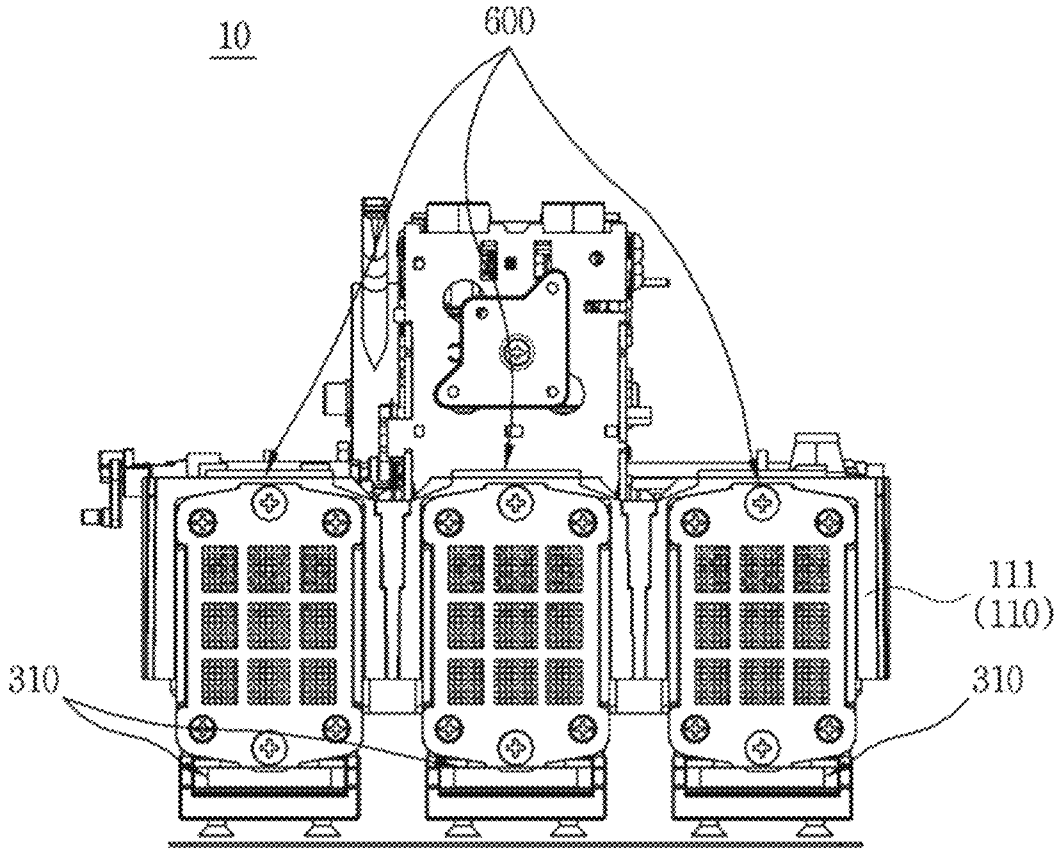
FIG. 4 is a plan view illustrating a state in which a rear cover is removed from the air circuit breaker of FIG. 1.
Figure 5:
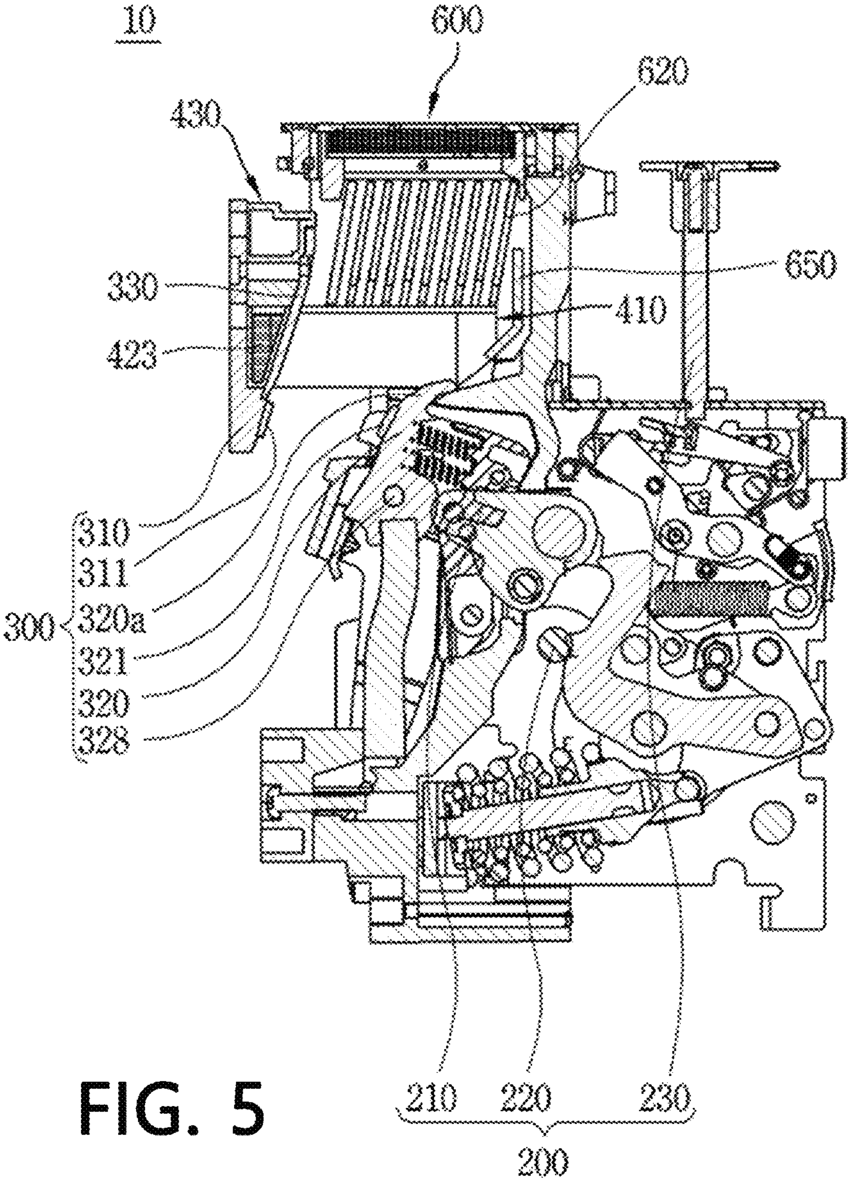
FIG. 5 is a cross-sectional view illustrating a state in which a rear cover is removed from the air circuit breaker of FIG. 1.
Figure 6:
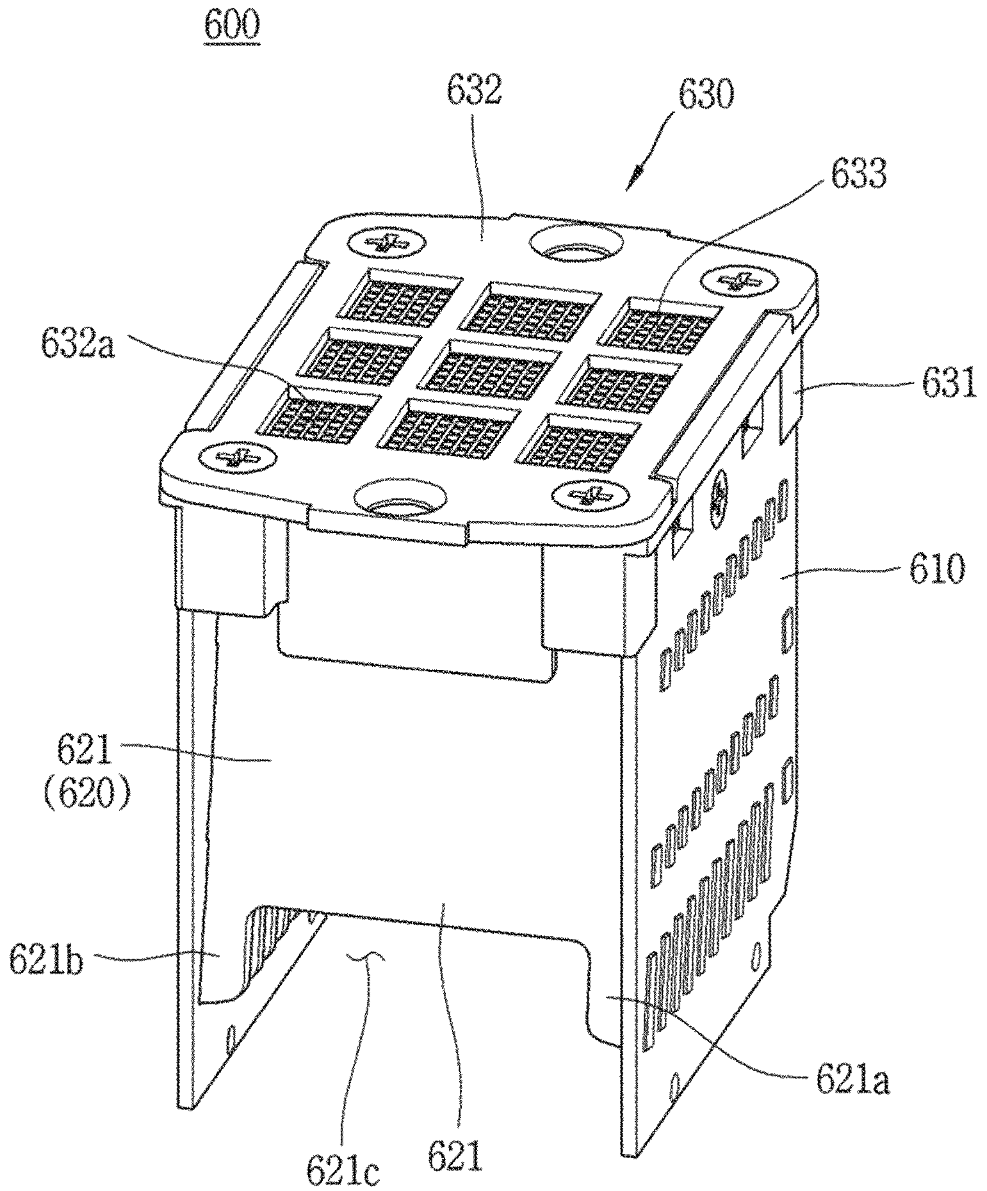
FIGS. 6 and 7 are perspective views illustrating an exemplary embodiment of an arc extinguishing unit provided in the air circuit breaker of FIG. 1 from different directions.
Figure 7:
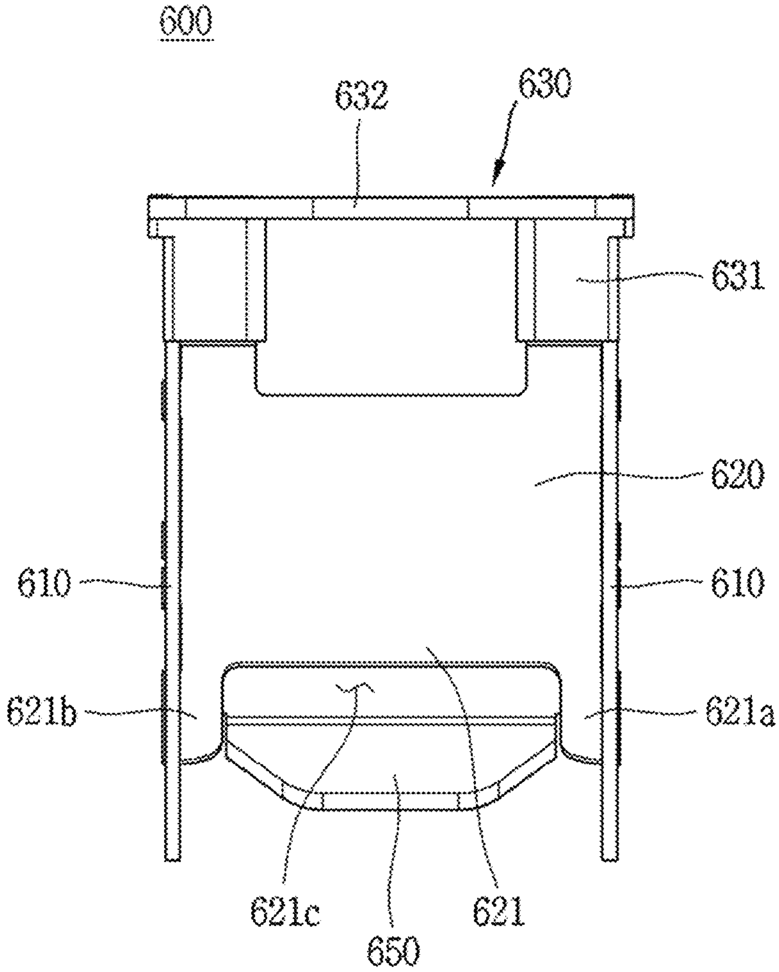
Figure 8:
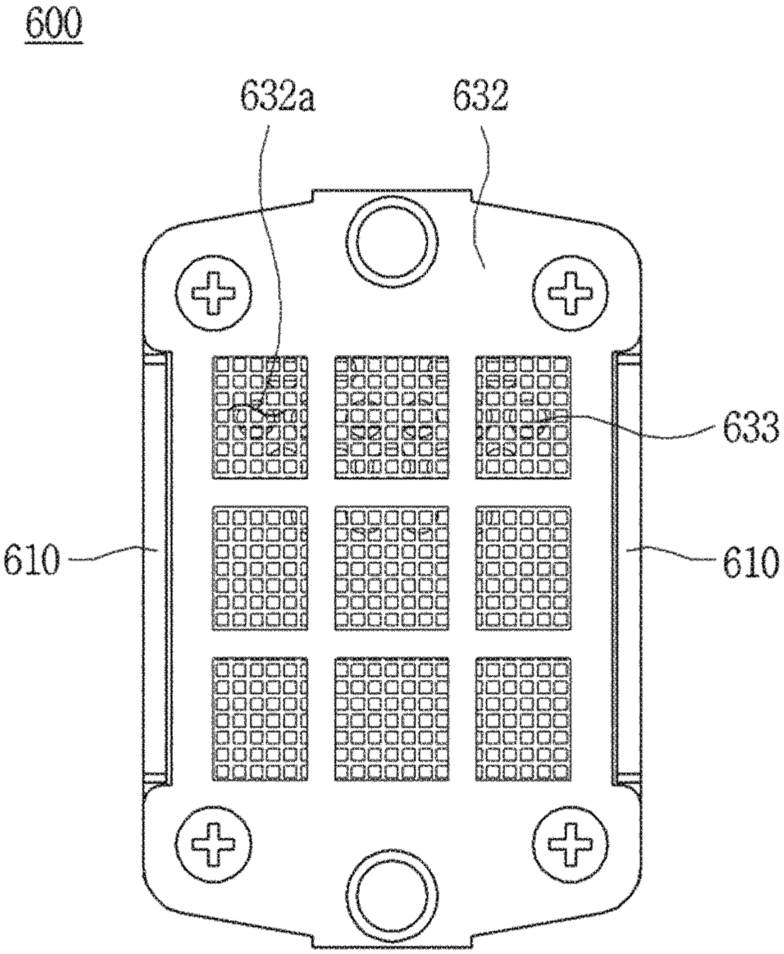
FIG. 8 is an exploded perspective view illustrating an exemplary embodiment of the arc extinguishing unit shown in FIG. 6.
Figure 9:
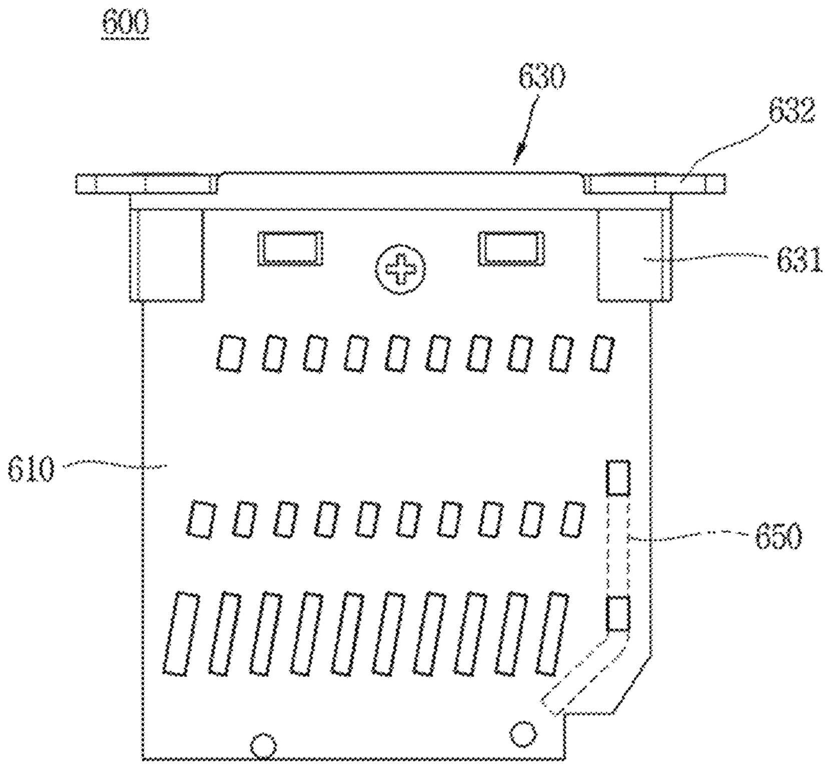
FIG. 9 is a front view illustrating an exemplary embodiment of the arc extinguishing unit shown in FIG. 6.
Figure 10:
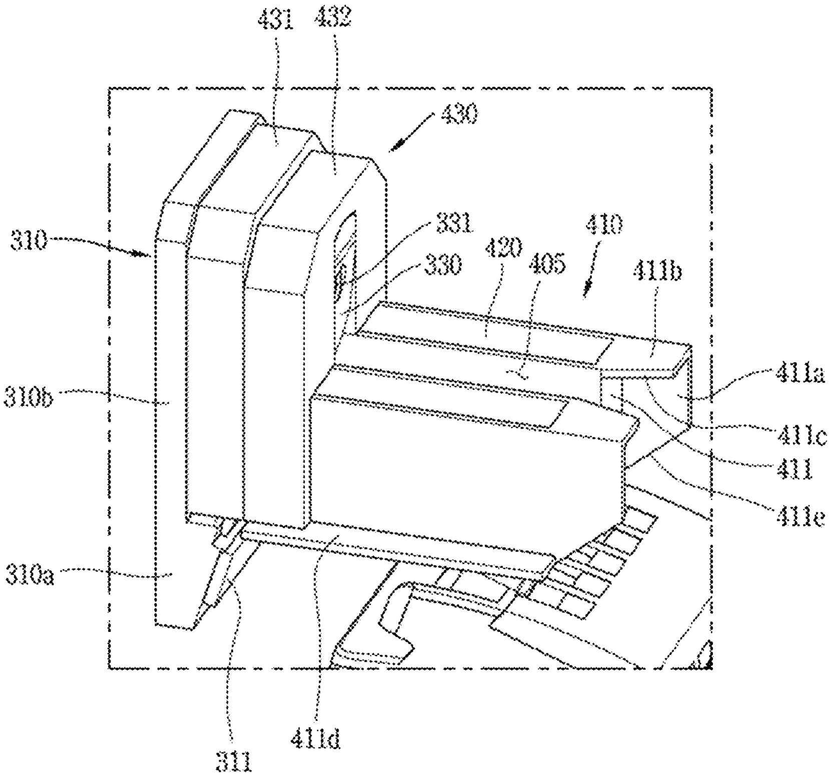
FIG. 10 is a plan view illustrating an exemplary embodiment of the arc extinguishing unit shown in FIG. 6.
Figure 11:
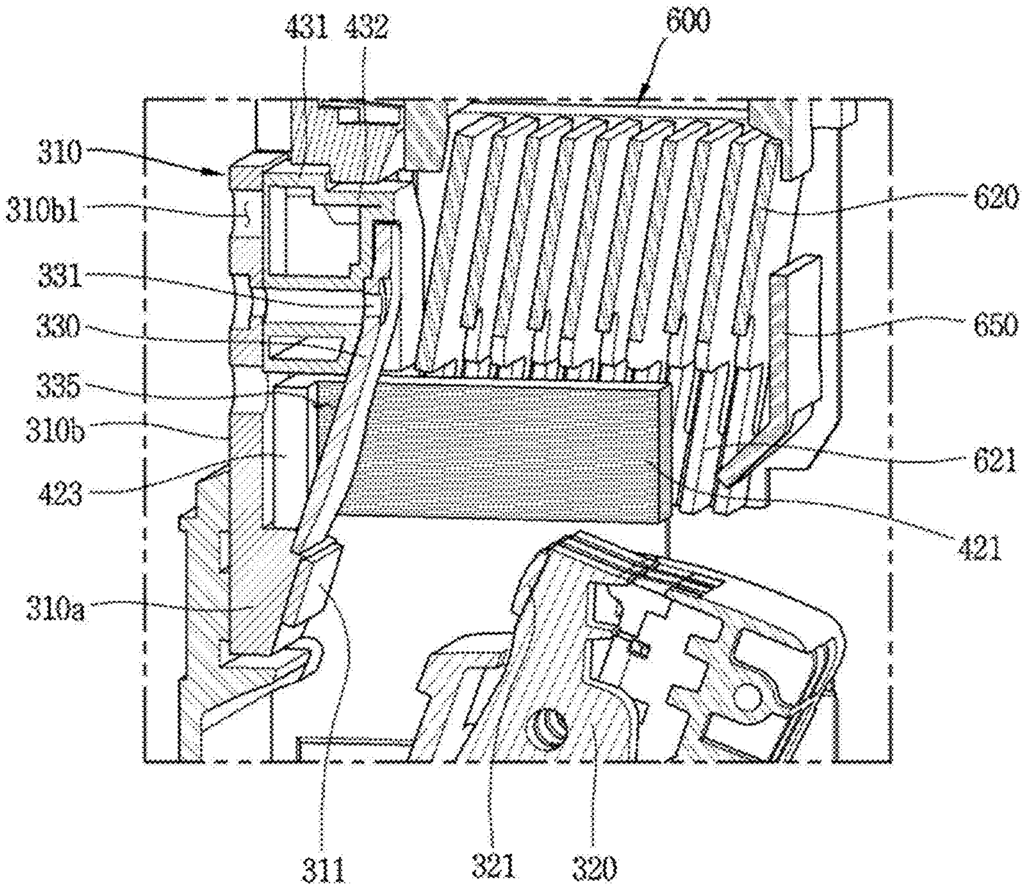
FIG. 11 is a perspective view illustrating a circuit breaking unit and an arc extinguishing unit in the air circuit breaker shown in FIG. 5.
Figure 12:
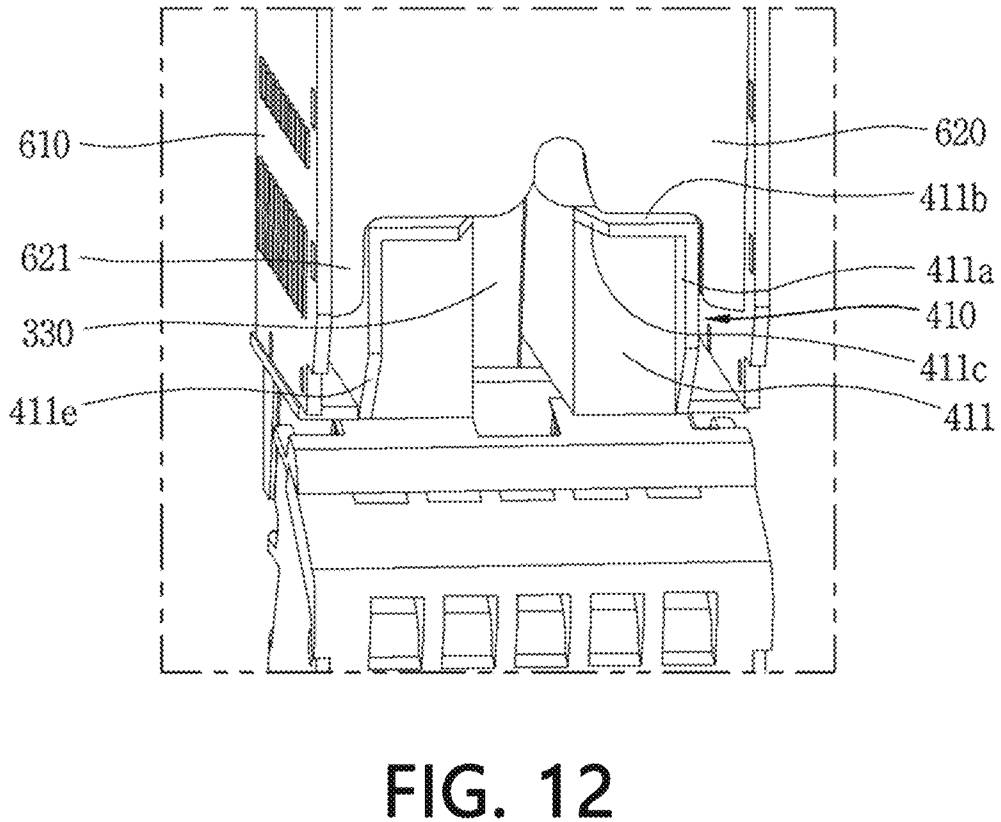
FIG. 12 is a partial perspective view illustrating a fixed contact terminal and a movable contact terminal shown in FIG. 11.

The terms "upper side or above", "lower side or below", "left side", "right side", "front side", and "rear side" used in the following description will be understood with reference to the coordinate system shown in FIG. 1.

2. Description of a Configuration of an Air Circuit Breaker 10 According to an Embodiment of the Present Disclosure Referring to FIGS. 1 to 23, the air circuit breaker 10 according to an embodiment of the present disclosure includes a cover unit 100, a driving unit 200, a circuit breaking unit 300, a U assembly 400, and an arc extinguishing unit 600.

(1) Description of the Cover Unit 100

Referring to FIGS. 1 to 5, the air circuit breaker 10 according to an embodiment of the present disclosure includes a cover unit 100.

The cover unit 100 forms the outer shape of the air circuit breaker 10. In addition, a space is formed inside the cover unit 100, and each component for operating the air circuit breaker 10 can be mounted in the space. That is, the cover unit 100 functions as a kind of housing.

The cover unit 100 may be formed of a material with high heat resistance and high rigidity. This is to prevent damage to each component mounted inside and to prevent damage caused by an arc generated inside. In an embodiment, the cover unit 100 may be formed of synthetic resin or reinforced plastic.

In the illustrated embodiment, the cover unit 100 has a quadrangular pillar shape with a height in the up and down direction. The shape of the cover unit 100 may be provided in any shape capable of mounting components for operating the air circuit breaker 10 therein.

The inner space of the cover unit 100 is energized to the outside. Each component mounted inside the cover unit 100 may be energizably connected to an external power source or load.

In the illustrated embodiment, the cover unit 100 includes an upper cover 110 and a lower cover 120.

The upper cover 110 forms the upper side of the cover unit 100. The upper cover 110 is positioned above the lower cover 120. In an embodiment, the upper cover 110 and the lower cover 120 may be integrally formed.

A space is formed inside the upper cover 110. Various components provided in the air circuit breaker 10 are mounted in the space. In an embodiment, the circuit breaking unit 300, the arc extinguishing unit 600, and the like may be mounted in the inner space of the upper cover 110.

The inner space of the upper cover 110 communicates with the inner space of the lower cover 120. Components such as the circuit breaking unit 300 may be accommodated throughout the inner space of the upper cover 110 and the inner space of the lower cover 120.

The arc extinguishing unit 600 is located on one side of the upper cover 110, i.e., on the upper surface in the illustrated embodiment. The arc extinguishing unit 600 may be partially exposed on the upper surface of the upper cover 110. The arc generated in the inner space of the upper cover 110 may pass through the arc extinguishing unit 600 and may be extinguished and discharged to the outside of the air circuit breaker 10.

On the other side of the upper cover 110, i.e., the front side in the illustrated embodiment, a fixed contact terminal 310 of the circuit breaking unit 300 is exposed. The fixed contact terminal 310 may be energizably connected to an external power source or load through the exposed portion.

In the illustrated embodiment, the upper cover 110 includes a first upper cover 111 and a second upper cover 112.

The first upper cover 111 is configured to cover one side of the upper side of the air circuit breaker 10, i.e., the front side in the illustrated embodiment. The first upper cover 111 is coupled to the second upper cover 112 by any fastening means.

An opening is formed in the first upper cover 111. The fixed contact terminal 310 may be exposed to the outside through the opening. In the illustrated embodiment, three of said openings are formed in the left-right direction.

The second upper cover 112 is configured to cover the other side of the upper side of the air circuit breaker 10, i.e., the rear side in the illustrated embodiment. The second upper cover 112 is coupled to the first upper cover 111 by any fastening means.

The lower cover 120 forms the lower side of the cover unit 100. The lower cover 120 is positioned below the upper cover 110.

A space is formed inside the lower cover 120. Various components provided in the air circuit breaker 10 are mounted in the space. In an embodiment, the driving unit 200, the circuit breaking unit 300, and the like may be mounted in the inner space of the lower cover 120.

The inner space of the lower cover 120 communicates with the inner space of the upper cover 110. Components such as the circuit breaking unit 300 may be accommodated throughout the inner space of the lower cover 120 and the inner space of the upper cover 110.

On one side of the lower cover 120, i.e., the front side in the illustrated embodiment, a movable contact terminal 320 of the circuit breaking unit 300 is located.

The movable contact terminal 320 may be exposed to the outside through an opening formed in the lower cover 120. The movable contact terminal 320 may be energizably connected to an external power source or load through the exposed portion.

(2) Description of the Driving Unit 200

Referring to FIGS. 1 to 5, the air circuit breaker 10 according to an embodiment of the present disclosure includes a driving unit 200.

The driving unit 200 is rotated as the fixed contact 311 and the movable contact 321 of the circuit breaking unit 300 are spaced apart, thereby performing a trip mechanism. Accordingly, the air circuit breaker 10 may break energization with the outside, and the user can recognize that an operation to break energization has been performed.

The driving unit 200 is accommodated inside the air circuit breaker 10. Specifically, the driving unit 200 is partially accommodated in a space inside the cover unit 100. In addition, the remaining portion of the driving unit 200 is accommodated inside a case provided on one side (the rear side in the illustrated embodiment) of the cover unit 100, which is not given with reference numerals.

The driving unit 200 is connected to the circuit breaking unit 300. Specifically, a crossbar 220 of the driving unit 200 is configured to rotate together with the rotation of the movable contact terminal 320 of the circuit breaking unit 300.

Therefore, when the movable contact terminal 320 of the circuit breaking unit 300 is rotated and moved, the driving unit 200 may be rotated together. The driving unit 200 is rotatably accommodated inside the air circuit breaker 10.

In the illustrated embodiment, the driving unit 200 includes a shooter 210, a crossbar 220 and a lever 230.

The shooter 210 is rotated together as the movable contact terminal 320 of the circuit breaking unit 300 is rotated away from the fixed contact terminal 310. The shooter 210 is connected to the crossbar 220 and the lever 230.

Specifically, one end of the shooter 210 is restrained by the crossbar 220. An elastic member is provided at the other end of the shooter 210. Accordingly, in a state in which the fixed contact 311 and the movable contact 321 are in contact, the shooter 210 presses the elastic member and stores restoring force. The external force for the pressing may be provided by a state in which the crossbar 220 is rotated toward the fixed contact terminal 310.

When the movable contact 321 is spaced apart from the fixed contact 311, the movable contact terminal 320 is rotated in a direction away from the fixed contact terminal 310. Accordingly, the crossbar 220 is also rotated, and one end of the shooter 210 is released and rotated by the restoring force provided by the elastic member.

The shooter 210 is connected to the lever 230. As the shooter 210 is rotated and strikes the lever 230, the lever 230 may be also rotated, and a trip mechanism may be performed.

The crossbar 220 is connected to the movable contact terminal 320 and is rotated together as the movable contact terminal 320 is rotated. Accordingly, the shooter 210 restrained by the crossbar 220 may be released, and a trip mechanism may be performed.

The crossbar 220 may extend between the plurality of circuit breaking units 300. In the illustrated embodiment, a total of three movable contact terminals 320 of the circuit breaking unit 300 are provided and disposed in the left-right direction. The crossbar 220 may be connected through the plurality of movable contact terminals 320 disposed in the left-right direction.

The crossbar 220 contacts the one end of the shooter 210 to restrain the shooter 210. When the crossbar 220 is rotated together with the movable contact terminal 320, the crossbar 220 releases the one end of the shooter 210.

The lever 230 may be hit and rotated by the rotating shooter 210. The lever 230 may be partially exposed to the outside of the air circuit breaker 10. When the trip mechanism is performed by the circuit breaking unit 300, the lever 230 is rotated in a preset direction.

Accordingly, the user can easily recognize that the trip mechanism has been performed. In addition, the user can rotate the lever 230 to adjust the air circuit breaker 10 to a state in which it can be energized again.

The process of performing the trip mechanism by the driving unit 200 is a well-known technique, and thus a detailed description thereof will be omitted.

(3) Description of the Circuit Breaking Unit 300

Referring to FIGS. 1 to 5, the air circuit breaker 10 according to an embodiment of the present disclosure includes a circuit breaking unit 300.

The circuit breaking unit 300 includes a fixed contact terminal 310 and a movable contact terminal 320 spaced apart from each other or in contact with each other.

When the fixed contact terminal 310 and the movable contact terminal 320 are in contact with each other, the air circuit breaker 10 may be energized with an external power source or load. When the fixed contact terminal 310 and the movable contact terminal 320 are spaced apart from each other, the air circuit breaker 10 is de-energized from an external power source or load. In this case, the external power applied to the air circuit breaker 10 may be DC power. In addition, the external power applied to the air circuit breaker 10 may be a small current.

The circuit breaking unit 300 is accommodated inside the air circuit breaker 10. Specifically, the circuit breaking unit 300 is rotatably accommodated in the inner space of the cover unit 100.

The circuit breaking unit 300 may be energized with the outside. In an embodiment, current from an external power source or load may flow into any one of the fixed contact terminal 310 and the movable contact terminal 320. In addition, current may flow from the other one of the fixed contact terminal 310 and the movable contact terminal 320 to an external power source or load.

The circuit breaking unit 300 may be partially exposed to the outside of the air circuit breaker 10. Accordingly, the circuit breaking unit 300 may be energizably connected to an external power source or load through a member such as a conducting wire (not shown).

A plurality of circuit breaking units 300 may be provided. The plurality of circuit breaking units 300 may be disposed to be spaced apart from each other in one direction. A partition wall may be provided between each of the circuit breaking units 300 to prevent interference between currents energized to each of the circuit breaking units 300.

In the illustrated embodiment, three circuit breaking units 300 are provided. In addition, the three circuit breaking units 300 are disposed to be spaced apart from each other in the left-right direction of the air circuit breaker 10. The number of circuit breaking units 300 may be changed according to the amount of current flowing through the air circuit breaker 10.

In the illustrated embodiment, the circuit breaking unit 300 includes a fixed contact terminal 310 and a movable contact terminal 320.

The fixed contact terminal 310 may be in contact with or spaced apart from the movable contact terminal 320. When the movable contact terminal 310 contacts the fixed contact terminal 320, the air circuit breaker 10 may be energized with an external power source or load. When the fixed contact terminal 310 and the movable contact terminal 320 are spaced apart from each other, the air circuit breaker 10 is de-energized from an external power source or load.

As can be seen from the name, the fixed contact terminal 310 is fixedly installed on the cover unit 100. Thus, the contact and separation of the fixed contact terminal 310 and the movable contact terminal 320 are achieved by the rotation of the movable contact terminal 320.

In the illustrated embodiment, the fixed contact terminal 310 is accommodated in the inner space of the upper cover 110.

The fixed contact terminal 310 may be partially exposed to the outside of the air circuit breaker 10. Through the exposed portion, the fixed contact terminal 310 may be energizably connected to an external power source or load.

In the illustrated embodiment, the fixed contact terminal 310 is exposed to the outside through an opening formed on the front side of the upper cover 110.

The fixed contact terminal 310 may be formed of a material having electrical conductivity. In an embodiment, the fixed contact terminal 310 may be formed of copper (Cu) or iron (Fe) and an alloy material including the same.

In the illustrated embodiment, the fixed contact 311 is disposed at the lower end of the fixed contact terminal 310. In addition, the fixed contact terminal 310 extends upward.

The fixed contact 311 may be in contact with or spaced apart from the movable contact 321. The fixed contact 311 is located on one side of the fixed contact terminal 310 towards the movable contact terminal 320, i.e., on the rear side in the illustrated embodiment.

The fixed contact 311 is energized with the fixed contact terminal 310. In the illustrated embodiment, the fixed contact 311 is located on the rear side of the fixed contact terminal 310. In an embodiment, the fixed contact 311 may be integrally formed with the fixed contact terminal 310.

When the fixed contact 311 and the movable contact 321 are in contact with each other, the air circuit breaker 10 is energizably connected to an external power source or load. In addition, when the fixed contact 311 is spaced apart from the movable contact 321, the air circuit breaker 10 is de-energized from an external power source or load.

A low runner 330 may extend and protrude above the fixed contact terminal 310. The low runner 330 may extend upward toward the arc extinguishing unit 600. One end of the low runner 330 is coupled to the fixed contact terminal 310 and the other end is formed to be spaced apart from the fixed contact terminal 310.

The low runner 330 is energized with the fixed contact terminal 310. In the illustrated embodiment, the low runner 330 is located on the rear side of the fixed contact terminal 310. In an embodiment, the low runner 330 may be integrally formed with the fixed contact terminal 310.

When the fixed contact terminal 310 and the movable contact terminal 320 are in contact with each other, the low runner 330 may be energized by contact with a protruding contact 322 to be described later.

The low runner 330 may serve to guide an arc generated when the fixed contact terminal 310 and the movable contact terminal 320 are separated from each other and transfer it to a grid 620. To this end, the low runner 330 may be formed of a magnetic body having magnetism. This is to apply an attractive force to the arc, which is a flow of electrons.

In addition, as the low runner 330 and the protruding contact 322 are spaced apart from a state in which they are in contact with each other, an arc may occur between the low runner 330 and the protruding contact 322. This will be described in detail later.

The movable contact terminal 320 may be in contact with or spaced apart from the fixed contact terminal 310. It is as described above that the air circuit breaker 10 can be energized or de-energized from an external power source or load by contact and separation between the movable contact terminal 320 and the fixed contact terminal 310.

The movable contact terminal 320 may include an extension portion 320*a* in which the movable contact 321 is disposed and at least a portion thereof extends upward. Specifically, referring to the drawings, at least a portion of the movable contact terminal 320 may extend upward. The protruding contact 322 may be disposed on the extension portion 320*a*.

The movable contact terminal 320 is rotatably installed in the inner space of the cover unit 100. The movable contact terminal 320 may be rotated in a direction toward the fixed contact terminal 310 and in a direction away from the fixed contact terminal 310.

In the illustrated embodiment, the movable contact terminal 320 is accommodated in the inner spaces of the upper cover 110 and the lower cover 120. It is as described above that the inner spaces of the upper cover 110 and the lower cover 120 may communicate with each other.

The movable contact terminal 320 may be partially exposed to the outside of the air circuit breaker 10. Through the exposed portion, the movable contact terminal 320 may be energizably connected to an external power source or load.

In the illustrated embodiment, the movable contact terminal 320 is exposed to the outside through an opening formed on the front side of the lower cover 120.

The movable contact terminal 320 may be formed of a material having electrical conductivity. In an embodiment, the movable contact terminal 320 may be formed of copper or iron and an alloy material including the same.

The movable contact terminal 320 is connected to the driving unit 200. Specifically, the movable contact terminal 320 is connected to the crossbar 220 of the driving unit 200. In an embodiment, the crossbar 220 may be coupled through the movable contact terminal 320.

When the movable contact terminal 320 is rotated, the crossbar 220 may also be rotated. Accordingly, it is as described above that the driving unit 200 is operated, and the trip mechanism can be performed.

In the illustrated embodiment, the movable contact terminal 320 includes a movable contact 321 and a rotation shaft 328.

The movable contact 321 may be in contact with or spaced apart from the fixed contact 311. The movable contact 321 is located on one side of the movable contact terminal 320 towards the fixed contact terminal 310, i.e., on the front side in the illustrated embodiment.

The movable contact 321 may be rotated together with the movable contact terminal 320. When the movable contact terminal 320 is rotated toward the fixed contact terminal 310, the movable contact 321 may also be rotated toward the fixed contact 311 to contact the fixed contact 311.

In addition, when the movable contact terminal 320 is rotated in a direction away from the fixed contact terminal 310, the movable contact 321 may also be spaced apart from the fixed contact 311.

The movable contact 321 is energized with the movable contact terminal 320. In the illustrated embodiment, the movable contact 321 is located on the front side of the movable contact terminal 320. In an embodiment, the movable contact 321 may be integrally formed with the movable contact terminal 320.

It is as described above that the air circuit breaker 10 is energized with or de-energized from an external power source or load by contact and separation between the movable contact 321 and the fixed contact 311.

When the fixed contact 311 and the movable contact 321 are spaced apart from each other in a state in which the fixed contact 311 and the movable contact 321 are brought into contact with each other and are energized, an arc is generated. The air circuit breaker 10 according to an embodiment of the present disclosure includes various components for effectively forming a path of an arc generated. This will be described later in detail.

The rotation shaft 328 is a portion where the movable contact terminal 320 is rotatably coupled to the cover unit 100. The movable contact terminal 320 may be rotated in a direction toward the fixed contact terminal 310 or in a direction away from the fixed contact terminal 310 about the rotation shaft 328.

The rotation shaft 328 is located on the other side of the movable contact terminal 320 opposite to the fixed contact terminal 310, i.e., on the rear side in the illustrated embodiment.

(4) Description of the Arc Extinguishing Unit 600

Referring to FIGS. 6 to 9, the air circuit breaker 10 according to an embodiment of the present disclosure includes an arc extinguishing unit 600.

The arc extinguishing unit 600 is configured to extinguish an arc generated when the fixed contact 311 and the movable contact 321 are spaced apart. The generated arc may pass through the arc extinguishing unit 600 and be discharged to the outside of the air circuit breaker 10 after being extinguished and cooled.

The arc extinguishing unit 600 is coupled to the cover unit 100. One side of the arc extinguishing unit 600 for arc discharge may be exposed to the outside of the cover unit 100. In the illustrated embodiment, the upper side of the arc extinguishing unit 600 is exposed to the outside of the cover unit 100.

The arc extinguishing unit 600 is partially accommodated in the cover unit 100. The remaining portion of the arc extinguishing unit 600 except for the portion exposed to the outside may be accommodated in the inner space of the cover unit 100. In the illustrated embodiment, the arc extinguishing unit 600 is partially accommodated on the upper side of the upper cover 110.

The arrangement may be changed according to the position of the fixed contact 311 and the movable contact 312.

That is, the arc extinguishing unit 600 may be positioned adjacent to the fixed contact 311 and the movable contact 312. Accordingly, an arc extending along the movable contact 312 rotated away from the fixed contact 311 may easily enter the arc extinguishing unit 600.

A plurality of arc extinguishing units 600 may be provided. The plurality of arc extinguishing units 600 may be disposed to be physically and electrically spaced apart from each other. In the illustrated embodiment, three arc extinguishing units 600 are provided.

That is, each arc extinguishing unit 600 is positioned adjacent to each fixed contact 311 and movable contact 321. In the illustrated embodiment, each arc extinguishing unit 600 is positioned adjacent to the upper side of each fixed contact 311 and movable contact 321.

The arc extinguishing units 600 may be disposed adjacent to each other. In the illustrated embodiment, the three arc extinguishing units 600 are disposed side by side in the left-right direction of the air circuit breaker 10.

In the illustrated embodiment, the arc extinguishing unit 600 includes a side plate 610, a grid 620, a grid cover 630, and an arc runner 650.

Side plates 610 form both sides of arc extinguishing unit 600, i.e., right and left in the illustrated embodiment. The side plate 610 is coupled to each component of the arc extinguishing unit 600 and supports the components.

Specifically, the side plate 610 is coupled to the grid 620, the grid cover 630, and the arc runner 650.

A plurality of side plates 610 are provided. The plurality of side plates 610 may be spaced apart from each other and disposed to face each other. In the illustrated embodiment, two side plates 610 are provided, forming the right and left sides of the arc extinguishing unit 600, respectively.

The side plate 610 may be formed of an insulating material. This is to prevent the generated arc from flowing toward the side plate 610.

The side plate 610 may be formed of a heat-resistant material. This is to prevent damage or shape deformation by the generated arc.

A plurality of through holes are formed in the side plate 610. The grid 620 and the arc runner 650 may be inserted and coupled to some of the through holes. In addition, fastening members for fastening the grid cover 630 to the side plate 610 may be coupled through some of the other through holes.

In the illustrated embodiment, the side plate 610 is provided in a plate shape having a plurality of edges formed at vertices. The side plate 610 may be provided in any shape capable of forming both sides of the arc extinguishing unit 600 and supporting each component of the arc extinguishing unit 600.

The side plate 610 is coupled to the grid 620. Specifically, insertion protrusions provided at opposite sides of the grid 620, i.e., the right end and the left end in the illustrated embodiment, are inserted into and coupled to some of the through holes of the side plate 610.

The side plate 610 is coupled to the grid cover 630. Specifically, the grid cover 630 is coupled to the upper side of the side plate 610. The above coupling may be achieved by a fitting coupling between the side plate 610 and the grid cover 630 or by a separate fastening member.

The side plate 610 is coupled to the arc runner 650. Specifically, the arc runner 650 is coupled to the rear side of the side plate 610, that is, to one side opposite to the fixed contact 311. The above coupling may be achieved by a separate fastening member.

The grid 620 guides an arc generated when the fixed contact 311 and the movable contact 321 are spaced apart to the arc extinguishing unit 600.

The grid 620 may be formed of a material having magnetism. This is to apply an attractive force to the arc, which is a flow of electrons.

A plurality of grids 620 may be provided. The plurality of grids 620 may be spaced apart from each other and stacked. In the illustrated embodiment, a plurality of grids 620 are provided and stacked in the front-rear direction.

The number of grids 620 may be changed. Specifically, the number of grids 620 may be changed according to the size and performance of the arc extinguishing unit 600, or the rated capacity of the air circuit breaker 10 in which the arc extinguishing unit 600 is provided, or the like.

An introduced arc may be subdivided and flowed through a space formed by the plurality of grids 620 being spaced apart from each other. Accordingly, the pressure of the arc may be increased, and the moving speed and the extinguishing speed of the arc may be increased.

The arc runner 650 is positioned adjacent to the grid 620 furthest from the fixed contact 311 among the plurality of grids 620, i.e., the grid 620 on the rear side in the illustrated embodiment.

An end of the grid 620 in the width direction, i.e., left-right direction in the illustrated embodiment, may be formed to protrude toward the fixed contact 311, that is, toward the lower side. That is, the grid 620 is formed in a peak shape with left and right ends pointing downward.

Accordingly, the generated arc may effectively proceed toward the end of the grid 620 in the left-right direction, and may easily flow to the arc extinguishing unit 600.

The grid 620 is coupled to the side plate 610. Specifically, a plurality of coupling protrusions are formed at the edges of the grid 620 in the width direction, i.e., the left-right direction in the illustrated embodiment, in the extension direction, i.e., the up and down direction in the illustrated embodiment. The coupling protrusions of the grid 620 are inserted into and coupled to the through holes formed in the side plate 610.

One side of the grid 620 facing the grid cover 630, i.e., the upper end in the illustrated embodiment, may be positioned adjacent to the grid cover 630. The arc flowing along the grid 620 may pass through the grid cover 630 and be discharged to the outside.

The grid cover 630 forms the upper side of the arc extinguishing unit 600. The grid cover 630 is configured to cover the upper end of the grid 620. The arc passing through the space formed by the plurality of grids 620 spaced apart from each other may be discharged to the outside of the air circuit breaker 10 through the grid cover 630.

The grid cover 630 is coupled to the side plate 610. A protrusion inserted into the through hole of the side plate 610 may be formed at an edge of the grid cover 630 in the width direction, i.e., the left-right direction in the illustrated embodiment. In addition, the grid cover 630 and the side plate 610 may be coupled by a separate fastening member.

The grid cover 630 is formed to extend in one direction, i.e., in the front-rear direction in the illustrated embodiment. It will be understood that the above direction is the same as the direction in which the plurality of grids 620 are stacked.

The length of the grid cover 630 in the other direction, i.e., the width direction in the illustrated embodiment, may be determined according to the length of the plurality of grids 620 in the width direction.

In the illustrated embodiment, the grid cover 630 includes a cover body 631, an upper frame 632, a mesh part 633, and a circuit breaking plate (not shown).

The cover body 631 forms the outer shape of the grid cover 630. The cover body 631 is coupled to the side plate 610. In addition, the upper frame 632 is coupled to the cover body 631.

A predetermined space is formed inside the cover body 631. The space may be covered by the upper frame 632. The mesh part 633 and the circuit breaking plate are accommodated in the space. Accordingly, the space may be referred to as an "accommodation space".

The accommodation space communicates with a space formed by spacing the grids 620 apart. As a result, the accommodation space communicates with the inner space of the cover unit 100. Accordingly, the generated arc can flow into the accommodation space of the cover body 631 by passing through the space formed by the separation of the grids 620.

An upper end of the grid 620 may be in contact with one side of the cover body 631 facing the grid 620, i.e., the lower side in the illustrated embodiment. In an embodiment, the cover body 631 may support the upper end of the grid 620.

The cover body 631 may be formed of an insulating material. This is to prevent distortion of the magnetic field for forming an arc-guided path A.P.

The cover body 631 may be formed of a heat-resistant material. This is to prevent damage or shape deformation by the generated arc.

In the illustrated embodiment, the length of the cover body 631 in the front-rear direction is longer than the length in the left-right direction. The shape of the cover body 631 may be changed according to the shape of the side plate 610 and the shape and number of the grids 620.

The upper frame 632 is coupled to one side of the cover body 631 opposite to the grid 620, i.e., the upper side in the illustrated embodiment.

The upper frame 632 is coupled to the upper side of the cover body 631. The upper frame 632 is configured to cover the accommodation space formed in the cover body 631, the mesh part 633 accommodated in the accommodation space, and the circuit breaking plate.

In the illustrated embodiment, the length of the upper frame 632 in the front-rear direction is longer than the length in the left-right direction. The upper frame 632 may be provided in an arbitrary shape capable of stably being coupled to the upper side of the cover body 631 and covering the accommodation space and components accommodated in the accommodation space.

A plurality of through holes are formed in the upper frame 632. Through the through hole, an arc passing between the grids 620 and extinguished may be discharged. In the illustrated embodiment, three through-holes are provided in three rows in the front-rear direction, three in the left-right direction, and a total of nine through holes are formed. The number of through holes may be changed.

The through holes are located to be spaced apart from each other. A kind of rib is formed between the through holes. The rib may press the mesh part 633 accommodated in the space of the cover body 631, and the circuit breaking plate from the upper side.

Accordingly, even though an arc is generated, the mesh part 633 and the circuit breaking plate do not arbitrarily move away from the accommodation space of the cover body 631.

The upper frame 632 may be fixedly coupled to an upper side of the cover body 631. In the illustrated embodiment, the upper frame 632 is fixedly coupled to the upper side of the cover body 631 by a fastening member.

The mesh part 633 and the circuit breaking plate are positioned in the accommodation space of the cover body 631 between the upper frame 632 and the cover body 631, that is, in the lower side of the upper frame 632. In other words, the mesh part 633 and the circuit breaking plate are stacked from an upper side to a lower side in the accommodation space of the cover body 631.

The mesh part 633 passes through a space formed between the grids 620 and serves to filter out impurities remaining in the extinguished arc. The extinguished arc may pass through the mesh part 633 and be discharged to the outside after remaining impurities are removed. That is, the mesh part 633 functions as a kind of filter.

The mesh part 633 includes a plurality of through holes. It is preferable that the size, that is, the diameter of the through hole is smaller than the diameter of the impurity particles remaining in the arc. In addition, it is preferable that the diameter of the through hole is sufficiently large so that the gas included in the arc can pass through.

A plurality of mesh parts 633 may be provided. The plurality of mesh parts 633 may be stacked in the up and down direction. Accordingly, impurities remaining in the arc passing through the mesh part 633 can be effectively removed.

The mesh part 633 is accommodated in the accommodation space formed inside the cover body 631. The shape of the mesh part 633 may be determined according to the shape of the accommodation space.

The mesh part 633 is located below the upper frame 632. The plurality of through holes formed in the mesh part 633 communicate with the plurality of through holes formed in the upper frame 632. Accordingly, the arc passing through the mesh part 633 may pass through the upper frame 632 and be discharged to the outside.

The plurality of through holes formed in the mesh part 633 communicate with a space in which the grids 620 are spaced apart. As a result, the plurality of through holes formed in the mesh part 633 communicate with the inner space of the cover unit 100.

The circuit breaking plate is positioned below the mesh part 633. The circuit breaking plate provides a passage for the arc passing through the space formed between the grids 620 to flow toward the mesh part 633. The circuit breaking plate is accommodated in the accommodation space of the cover body 631. The circuit breaking plate is located at the lowermost side of the accommodation space of the cover body 631.

In the illustrated embodiment, the circuit breaking plate is formed to have a rectangular cross-section in which the length in the front-rear direction is longer than the length in the left-right direction. The shape of the circuit breaking plate may be changed according to the shape of the cross-section of the accommodation space of the cover body 631.

The grid 620 is positioned below the circuit breaking plate. In an embodiment, the upper end of the grid 620, i.e., one end of the grid 620 facing the circuit breaking plate, may be in contact with the circuit breaking plate. The circuit breaking plate includes a through hole (not shown).

The through hole is a passage through which an arc passing through a space formed by spacing the plurality of grids 620 from each other flows into the accommodation space of the cover body 631. The through hole is formed through in a direction perpendicular to the circuit breaking plate, i.e., in the up and down direction in the illustrated embodiment.

A plurality of through holes may be formed. The plurality of through holes may be disposed to be spaced apart from each other.

The arc runner 650 is located on one side of the side plate 610 facing the fixed contact 311 and the movable contact 321. In the illustrated embodiment, the arc runner 650 is located on the lower side of the side plate 610.

The arc runner 650 is located on the other side of the side plate 610 opposite to the fixed contact 311. Specifically, the arc runner 650 is located on the rear side in the lower side of the side plate 610 so as to be opposite to the fixed contact 311 located on the front side of the side plate 610.

The arc runner 650 is coupled to the side plate 610. The coupling may be formed by inserting a protrusion formed at an end of the arc runner 650 in the left-right direction into a through hole formed in the side plate 610.

The arc runner 650 may be formed of a conductive material. This is to guide the arc effectively by applying an attractive force to the flowing arc. In an embodiment, the arc runner 650 may be formed of copper, iron, or an alloy including the same.

The arc runner 650 extends toward the grid 620 by a predetermined length. In an embodiment, the arc runner 650 may be disposed to cover the grid 620 located farthest from the fixed contact 311, i.e., the grid 620 located at the rearmost side in the illustrated embodiment, from the rear side.

Accordingly, since the arc does not extend beyond the grid 620 located at the rearmost side, damage to the cover unit 100 can be prevented. Also, the generated arc can be effectively guided toward the grid 620.

The grid 620 may include a grid leg 621. The grid leg 621 may include a grid leg 621 that extends from at least one end in the width direction and extends downward to surround the protruding contact 322.

Specifically, referring to the drawings, the grid legs 621 extend from both ends of the grid 620 toward the movable contact terminal 320. In addition, referring to the drawings, the grid leg 621 may be formed to surround the outside of the U assembly 400.

The grid leg 621 may include a first grid leg 621*a* disposed on one side and a second grid leg 621*b* disposed opposite to the first grid leg 621*a*.

A grid leg groove 621*c* may be formed between the grid legs 621.

Since the grid leg 621 extends downward along the side plate 610, it becomes closer physically to the arc generated in the arc-generation area A.A, and thus, the arc can be easily applied. Accordingly, the arc can be extinguished quickly. In addition, an air gap A.G, which is a separation space, may be formed between the grid leg 621 and the protruding contact 322.

In addition, a magnetic field may be induced in the grid leg 621 by an arc generated between the protruding contact 322 and the low runner 330. At this time, the arc may receive an electromagnetic force in an upward direction by the induced magnetic field. Accordingly, an arc can be more easily applied to the grid 620.

(5) Description of the Protruding Contact 322

The circuit breaking unit 300 according to an embodiment of the present disclosure may further include a protruding contact 322.

Referring to FIGS. 17 to 21, the protruding contact 322 may be disposed on the extension portion 320*a* to be spaced apart from the movable contact 321. That is, the protruding contact 322 is spaced apart from the movable contact 321 along the extension portion 320*a* and disposed above the movable contact 321. In this case, the protruding contact 322 may be disposed to contact the low runner 330 while the movable contact 321 is in contact with the fixed contact 311.

As the protruding contact 322 and the low runner 330 are in contact with each other, and thus, there may be energized between the protruding contact 322 and the low runner 330.

And, when the movable contact terminal 320 is tripped, the protruding contact 322 and the low runner 330 are also spaced apart from each other, and during this process, an arc may be generated between the protruding contact 322 and the low runner 330.

The protruding contact 322 is disposed extending from at least one of the plurality of movable contacts 321.

For example, the protruding contact 322 may be formed by protruding the middle three of the five movable contacts 321, or by protruding the first, third, and fifth movable contacts 321, or by protruding the second, fourth movable contacts 321. Alternatively, in a case different from the case described above, the protruding contact 322 may be formed extending from at least one of the movable contacts 321.

Figure 20:
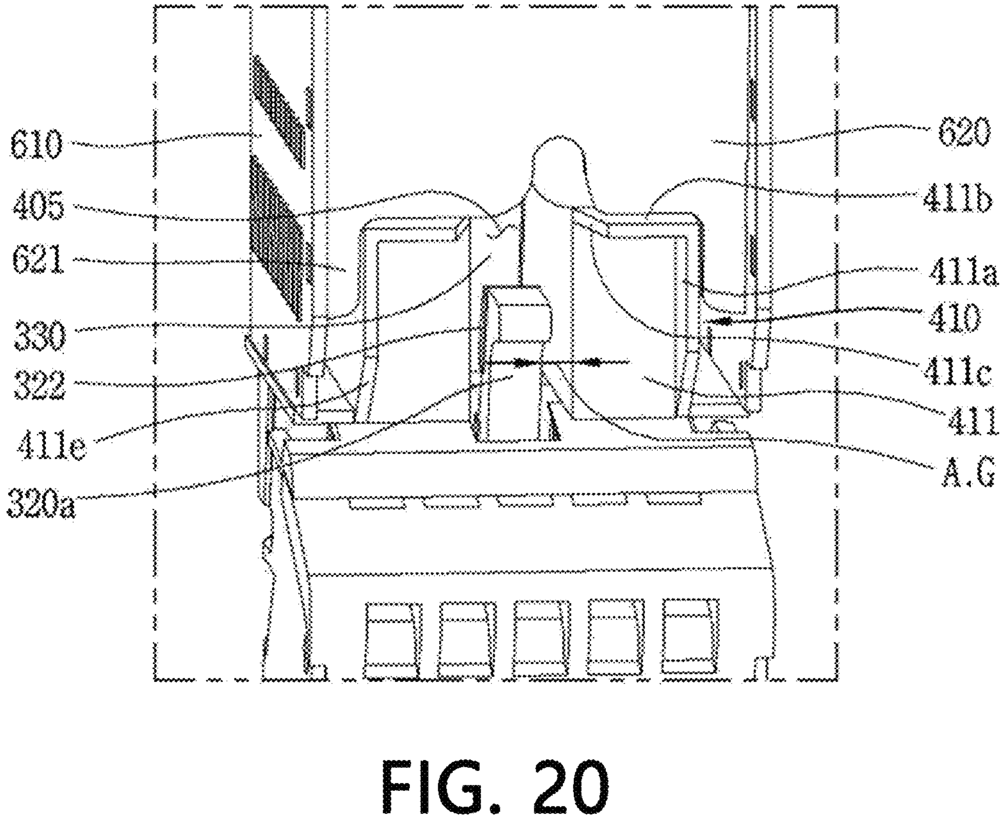
FIG. 20 is a perspective view of the circuit breaking unit and the arc extinguishing unit shown in FIG. 17 viewed from another direction.

In an embodiment of the present disclosure, as shown in FIG. 20, the protruding contact 322 may protrude from an upper side of the centrally disposed movable contact 321 among the plurality of movable contacts 321.

The protruding contact 322 may extend upward so as to overlap at least a portion of the side plate 610 of the arc extinguishing unit 600 disposed above the protruding contact 322.

Specifically, as shown in FIG. 20, the protruding contact 322 may extend so that an upper portion of the protruding contact 322 overlaps the side plate 610 of the arc extinguishing unit 600. Through this, the generated arc can be more quickly applied to the grid 620 and extinguished.

The width of the protruding contact 322 may be formed to correspond to the width of the movable contact 321 from which the protruding contact 322 extends.

Figure 19:
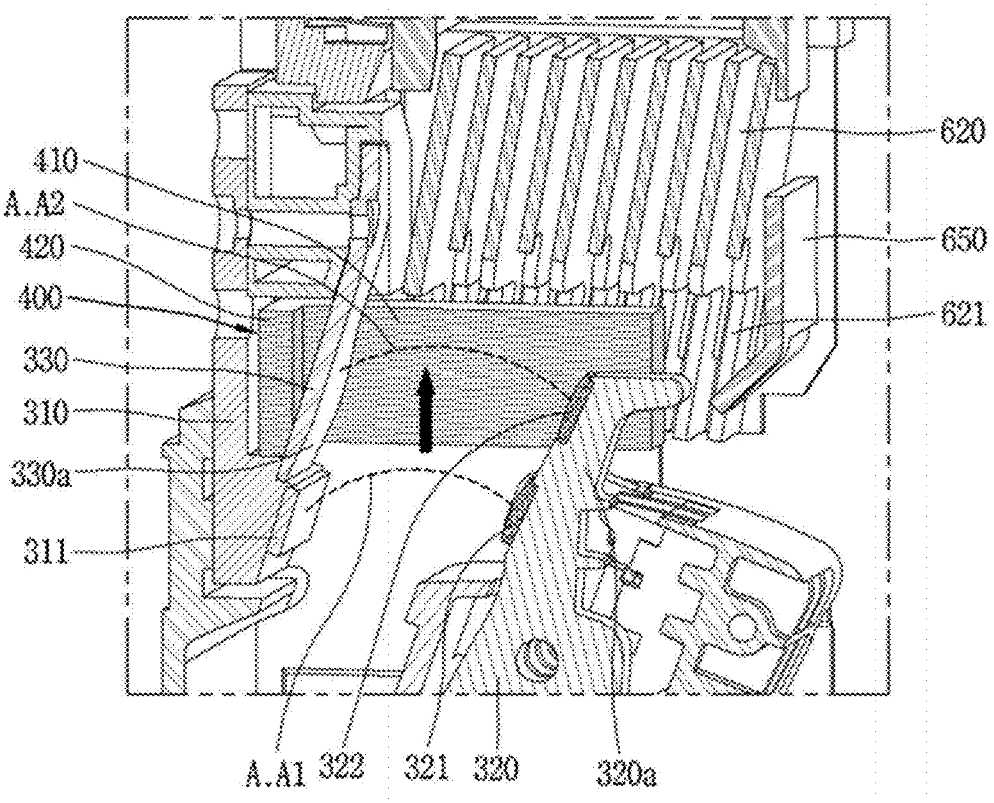
FIG. 19 is a perspective view illustrating a state in which the circuit breaking unit and the arc extinguishing unit shown in FIG. 17 are disposed in a trip state.

Specifically, referring to FIG. 19 and the like, the width of the protruding contact 322 is formed to correspond to the width of the movable contact 321 from which the protruding contact 322 extends. In other words, the width of the protruding contact 322 may be the same as or similar to the width of the movable contact 321 from which the protruding contact 322 extends. Through this, interference with an adjacent movable contact 321 or interference between adjacent protruding contacts 322 when a plurality of protruding contacts 322 are formed can be reduced.

(6) Trip Mechanism of the Movable Contact Terminal 320 and Movement of the Arc-Generation Area A.A In the present embodiment, the arc-generation area includes a first arc-generation area A.A1 and a second arc-generation area A.A2.

The first arc-generation area A.A1 is formed between the fixed contact 311 and the movable contact 321. The second arc-generation area A.A2 is formed between the protruding contact 322 and the low runner 330.

The low runner 330 may play the same role as the fixed contact 311 in relation to the protruding contact 322. Thus, the second arc-generation area A.A2 may be formed between the protruding contact 322 and the low runner 330.

The protruding contact 322 is disposed above the movable contact 321 on the movable contact terminal 320. In this case, the protruding contact 322 and the low runner 330 are separated from each other a very short moment later than when the movable contact 321 and the fixed contact 311 are separated.

Specifically, when the trip mechanism of the movable contact terminal 320 occurs to separate the movable contact 321 from the fixed contact 311, the movable contact 321 and the fixed contact 311 may be first separated with a very short time difference, and then the protruding contact 322 and the low runner 330 may be separated.

That is, when the circuit breaking unit 300 performs the trip mechanism, the protruding contact 322 and the lower runner 330 are separated later in time than the movable contact 321 and the fixed contact 311, and thus even after energization is cut off between the movable contact 321 and the fixed contact 311, energization occurs between the protruding contact 322 and the low runner 330 for a short time.

In relation to this, the trip state will be described as follows.

The movable contact terminal 320 is made movable between an energized state in which the movable contact 321 and the fixed contact 311 are in contact with each other and the low runner 330 and the protruding contact 322 are in contact with each other, and a trip state in which the movable contact 321 and the fixed contact 311 are spaced apart from each other and the low runner 330 and the protruding contact 322 are spaced apart from each other.

Figure 17:
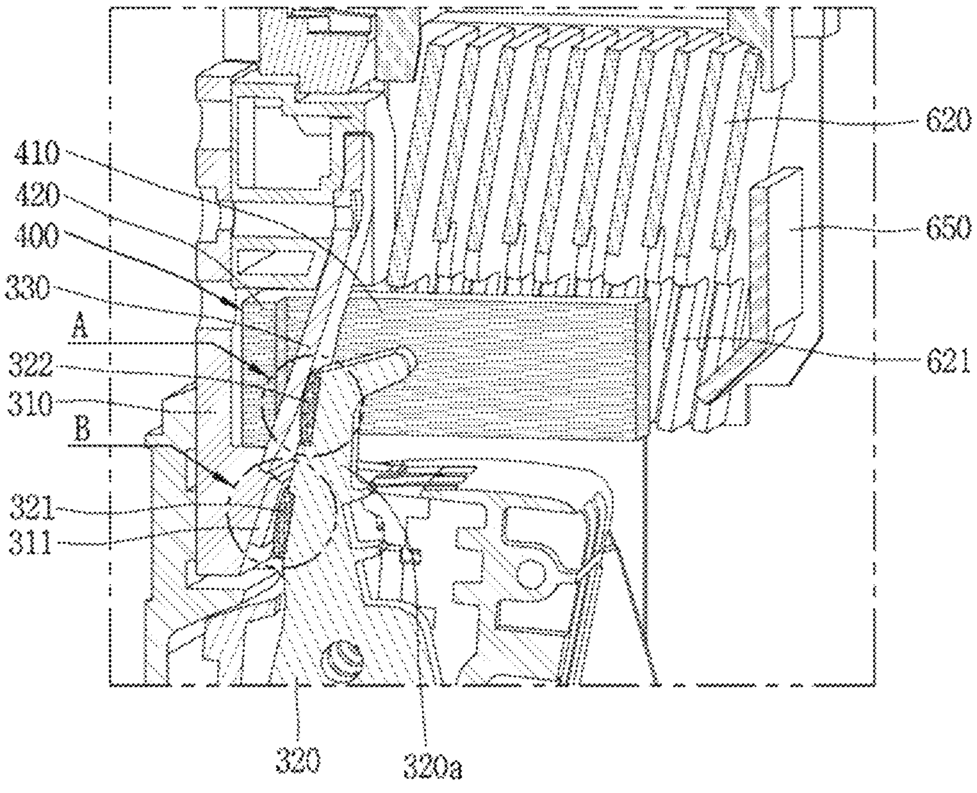
FIG. 17 is a perspective view illustrating a circuit breaking unit and an arc extinguishing unit according to another exemplary embodiment of the present disclosure.

Specifically, FIG. 17 is a diagram showing an energized state. The movable contact 321 and the protruding contact 322 contact the fixed contact 311 and the low runner 330, respectively, and are energized, respectively.

In this case, since DC power is applied as described above, current may flow from the fixed contact 311 and the low runner 330 to the movable contact 321 and the protruding contact 322 or vice versa.

The trip state of the movable contact terminal 320 includes a first state in which the movable contact 321 and the fixed contact 311 are spaced apart from each other and contact of the low runner 330 and the protruding contact 322 is maintained, and a second state in which the movable contact 321 and the fixed contact 311 are spaced apart from each other and the low runner 330 and the protruding contact 322 are spaced apart from each other. And, the trip state of the movable contact terminal 320 may be sequentially changed to the first state and the second state.

Specifically, FIG. 17 shows an energized state, FIG. 18 shows the first state, and FIG. 19 shows the second state.

Referring to FIG. 18, in the first state, the movable contact 321 and the fixed contact 311 are spaced apart from each other. And, in the first state, contact is maintained between the low runner 330 and the protruding contact 322. Therefore, in the first state, a complete trip has not yet occurred, and energization is achieved through the low runner 330 and the protruding contact 322.

And, referring to FIG. 19, the second state is formed when the protruding contact 322 and the low runner 330 are spaced apart. An arc is generated at the final separation site.

In a state where the protruding contact 322 is not provided, an arc is generated through the first arc-generation area A.A1. However, in the first state of the trip state, since the protruding contact 322 maintains contact with the low runner 330 and the movable contact 321 and the fixed contact 311 are spaced apart from each other, when changing from the first state to the second state, the final separation site becomes the low runner 330 and the protruding contact 322.

Therefore, the arc generated in the first arc-generation area A.A1 when the protruding contact 322 is not provided is generated in the second arc-generation area A.A2 by the protruding contact 322 and the low runner 330 having the above-described features.

According to an embodiment of the present disclosure, by providing the low runner 330 and the protruding contact 322, there is an effect that the location where the arc is generated is moved upward. That is, according to an embodiment of the present disclosure, there is an effect that an area where an arc is generated is moved upward by a distance in which the protruding contact 322 protrudes upward from the movable contact 321.

In other words, in the circuit breaking unit including the protruding contact 322 and the low runner 330 according to an embodiment of the present disclosure, the arc-generation area is moved from between the movable contact 321 and the fixed contact 311 (the first arc-generation area A.A1) to between the protruding contact 322 and the low runner 330 (the second arc-generation area A.A2), and thus is moved close to the arc extinguishing unit 600, i.e., the grid 620.

The present disclosure provides a protruding contact 322 and a low runner 330 that are in contact with each other in a state in which a fixed contact 311 and a movable contact 321 are spaced apart in the first state of the trip state, and a protruding contact 322 and a low runner 330 that are spaced apart in the second state, and thus generates an arc closer to a grid 620 when a small current breaking occurs in a DC air circuit breaker. Since the distance between the generated arc and the grid 620 decreases, the time at which the arc is applied to the grid 620 becomes shorter, and thus the arc can be quickly extinguished.

(7) Description of the U Assembly 400

Referring to FIGS. 13 to 16, the circuit breaking unit and the air circuit breaker including the same according to an embodiment of the present disclosure may further include a U assembly 400.

Referring to the drawings, the U assembly 400 is disposed between the low runner 330 and the fixed contact terminal 310.

The fixed contact terminal 310 includes a base 310*a* on which the fixed contact 311 is disposed, and a vertical portion 310*b* extending upward from the base 310*a*. The low runner 330 may be disposed on the base 310*a*. A coupling hole 331 through which a coupling member coupling the fixing part 430 and the fixed contact terminal 310 can pass may be formed at an end side of the low runner 330. A plurality of opening holes 310*b*1 communicating with the outside may be formed in the vertical portion 310*b*.

The U assembly 400 extends between the arc extinguishing unit 600 and the protruding contact 322. That is, the U assembly 400 goes away from the fixed contact terminal 310 and extends toward the movable contact 321.

Specifically, the U assembly 400 extends between the arc extinguishing unit 600 and the movable contact terminal 320 or between the arc extinguishing unit 600 and the protruding contact 322 in the trip state. That is, the U assembly 400 extends between the arc extinguishing unit 600 and the protruding contact 322 from both sides of the low runner 330. The U assembly 400 may extend to surround a side surface of the protruding contact 322 when the protruding contact 322 is disposed in a trip state.

An air gap A.G, which is a separation space, may be formed between the U assembly 400 and the protruding contact 322.

The U assembly 400 may include a holder 410, a U magnetic body 420 and 420', and a fixing part 430.

The holder 410 is inserted between the low runner 330 and the fixed contact terminal 310, has a space formed therein, and protrudes from both sides of the low runner 330.

The holder 410 includes a case 411 with an open upper side. The case 411 is formed with a storage part 412 inside which a U magnetic body can be stored. The open upper side of the holder 410 is sealed after storing the magnetic body in the storage part 412. For example, after the U magnetic body is stored, the open upper side of the holder 410 may be sealed by molding. Alternatively, an upper structure of the case 411 may be further provided and coupled to the case 411 so that the upper side of the case 411 is sealed after the U magnetic body is stored in the storage part 412 of the holder 410.

A sidewall portion 411*a* and an upper wall portion 411*b* may protrude from the front surface portion of the case 411, that is, in a direction where the case 411 is away from the fixed contact terminal 310. The sidewall portion 411*a* and the upper wall portion 411*b* may protect the case 411 from the protruding contact 322 and the movable contact terminal 320. At the same time, the sidewall portion 411*a* and the upper wall portion 411*b* may serve as peaks through which an arc can be easily applied to the case 411.

A first inclined portion 411*c* may be formed on the inner side of the upper wall portion 411*b* facing each other on opposite sides. The first inclined portion 411*c* may guide the protruding contact 322 into an inner space 405 between the cases 411.

A second inclined portion 411*e* may be formed on the lower part of the sidewall portion 411*a*. The second inclined portion 411*e* can prevent the movable contact terminal 320 from being caught on the case 411 when the movable contact terminal is tripped.

A side wing portion 411*d* may protrude to the outside of the case 411. The side wing portion 411*d* may protect the bottom of the grid leg 621 from the rotating movable contact terminal 320.

A coupling protrusion 413 may protrude from the central surface of the case 411 on the rear surface of the case 411, that is, toward the side where the case 411 is close to the fixed contact terminal 310. The coupling protrusion 413 may be coupled to the coupling groove of the fixing part 430 to couple the holder 410 and the fixing part 430.

The holder 410 may include a gassing material that generates molecules that extinguish the arc when heat generated by the arc is applied. In addition, the fixing part 430 may include a gassing material.

The gassing material generates molecules capable of extinguishing the arc as the arc is applied. Accordingly, the generated arc can be quickly extinguished.

Specifically, when heat generated by an arc is applied to the gassing material, the gassing material releases molecules capable of extinguishing the arc. In other words, the gassing material can generate gases that can extinguish the arc. Through this, the arc generated in the arc extinguishing unit 600 can be quickly extinguished.

As the holder 410 is inserted between the fixed contact terminal 310 and the low runner 330, the fixed contact terminal 310 is disposed on the rear surface and the low runner 330 is disposed on the front surface.

As described above, as the low runner 330 is in contact with and separation from the protruding contact 322, an arc may be generated. In addition, the generated arc may be applied to the low runner 330. Thus, the low runner 330 may be damaged upon application of an arc.

In this case, since the holder 410 includes the gassing material, damage to the low runner 330 may be reduced by rapidly extinguishing the arc.

The U magnetic body is stored in the inner space of the holder 410 and is made of a magnetic body.

In an embodiment of the present disclosure, the U magnetic body 420 may include a magnet unit and an insulator 423.

The magnet unit is disposed to extend between the arc extinguishing unit 600 and the protruding contact 322 from the fixed contact terminal 310. In addition, a plurality of magnet units are provided and arranged to face each other.

Specifically, referring to the drawing of the U assembly 400, the magnet unit includes a first magnet unit 421 disposed on one side of the storage part 412 of the case 411 and a second magnet unit 422 disposed on the other side of the storage part 412 of the case 411 to face the first magnet unit 421.

In this case, the first magnet unit 421 and the second magnet unit 422 may be disposed so that surfaces facing each other have different polarities.

For example, when the N pole is disposed on the surface of the first magnet unit 421 facing the second magnet unit 422, the S pole may be disposed on the surface of the second magnet unit 422 facing the first magnet unit 421. Accordingly, a magnetic field may be formed between the first magnet unit 421 and the second magnet unit 422, coming out of one magnet unit and flowing into the other magnet unit.

Through the arrangement of the first magnet unit 421 and the second magnet unit 422, by forming the above-described magnetic field, an arc generated during a trip mechanism of the movable contact 321 and the fixed contact 311 may be subjected to an electromagnetic force upward.

Meanwhile, unlike the above description, the first magnet unit 421 and the second magnet unit 422 may be disposed so that surfaces facing each other have the same polarity.

In a DC air circuit breaker such as the air circuit breaker of the present disclosure, when surfaces facing each other are arranged to have different polarities, the Lorentz force is reversed when the direction of the direct current is reversed. Therefore, in order to extinguish all arcs generated regardless of the direction of the direct current flowing, the first magnet unit 421 and the second magnet unit 422 may be arranged so that surfaces facing each other have the same polarity.

Figure 23:
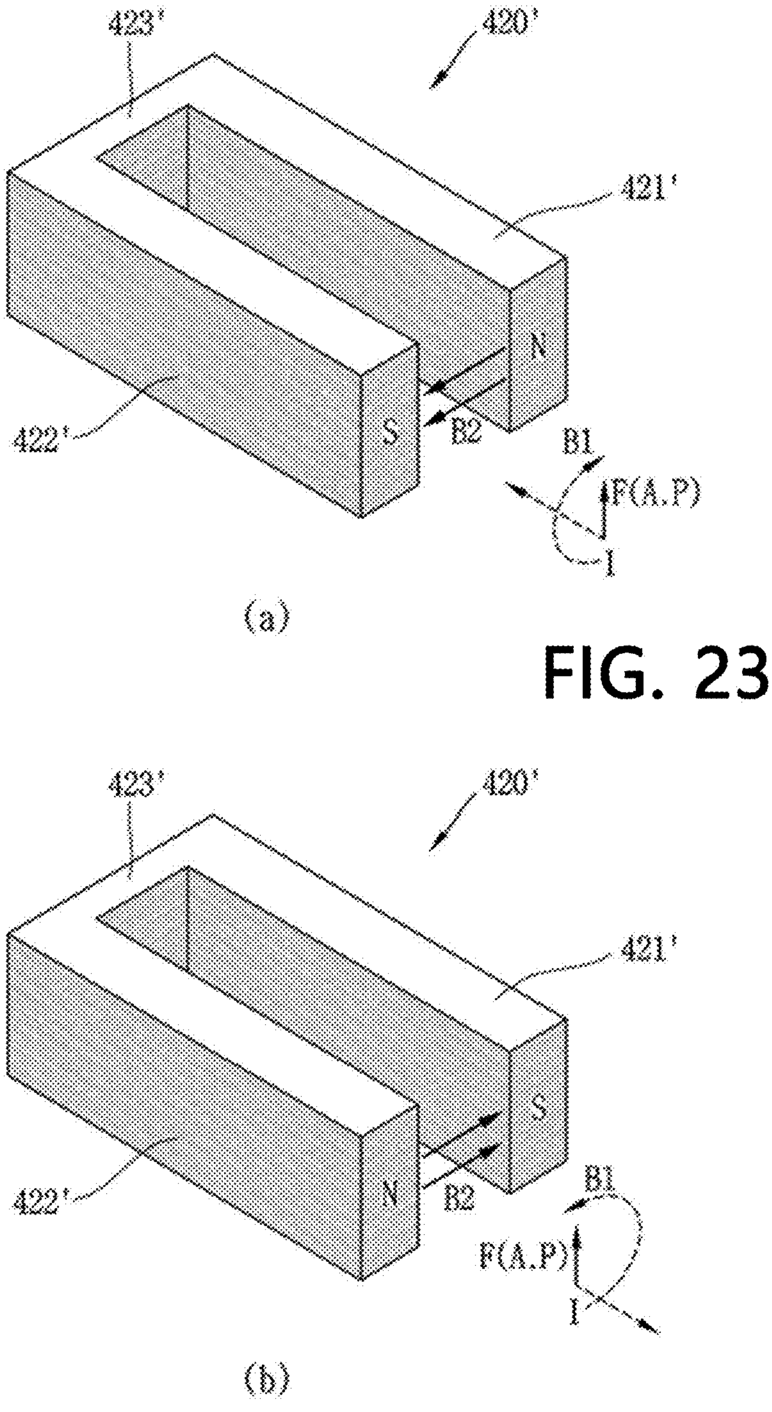
FIG. 23 is a diagram for explaining an induced magnetic field formed in a U magnetic body, and an electromagnetic force received by the arc due to the induced magnetic field, according to an exemplary embodiment of the present disclosure.
Figure 24:
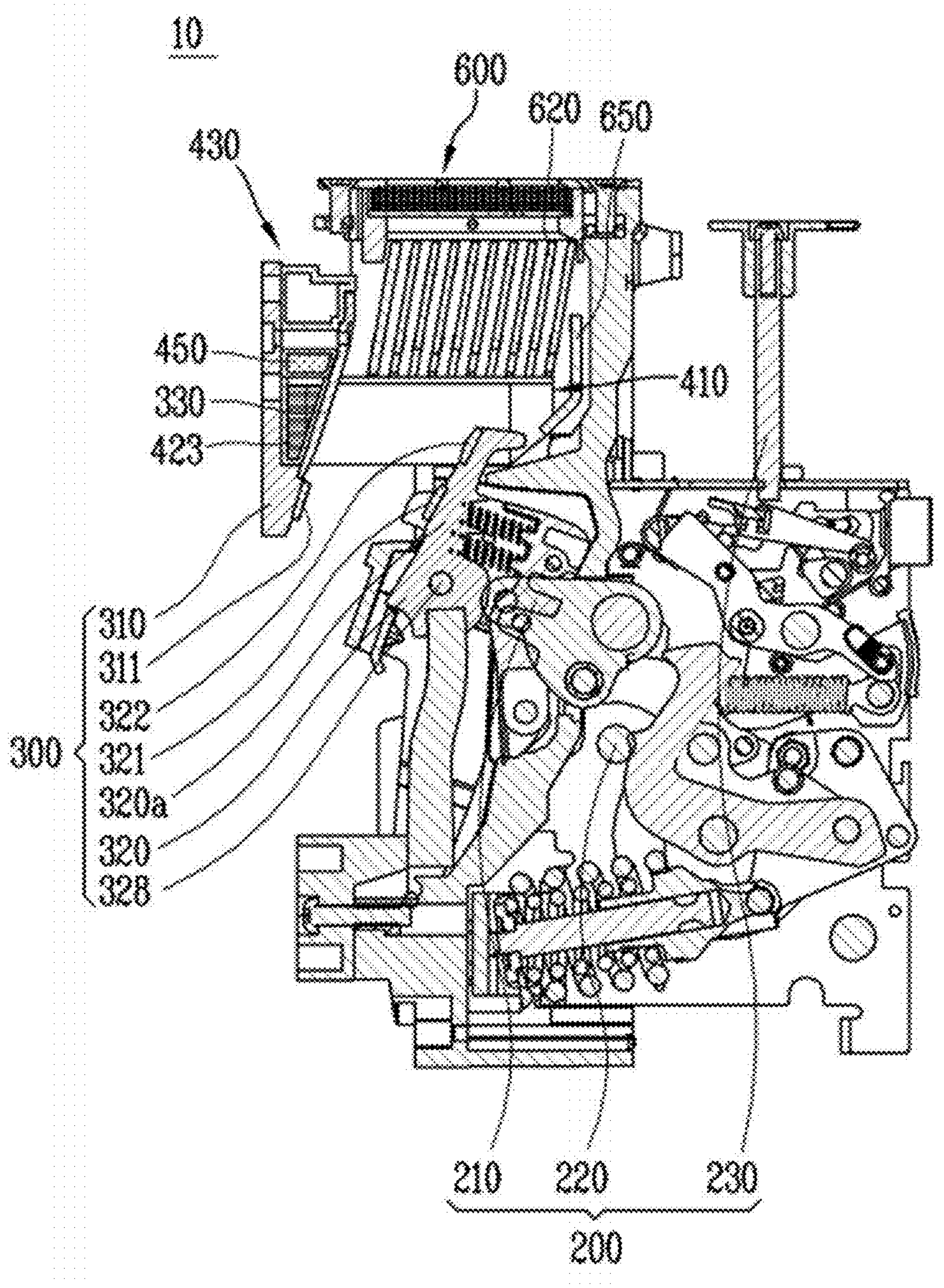
FIG. 24 is a cross-sectional view illustrating a state in which a rear cover is removed from an air circuit breaker according to another exemplary embodiment of the present disclosure.
Figure 25:
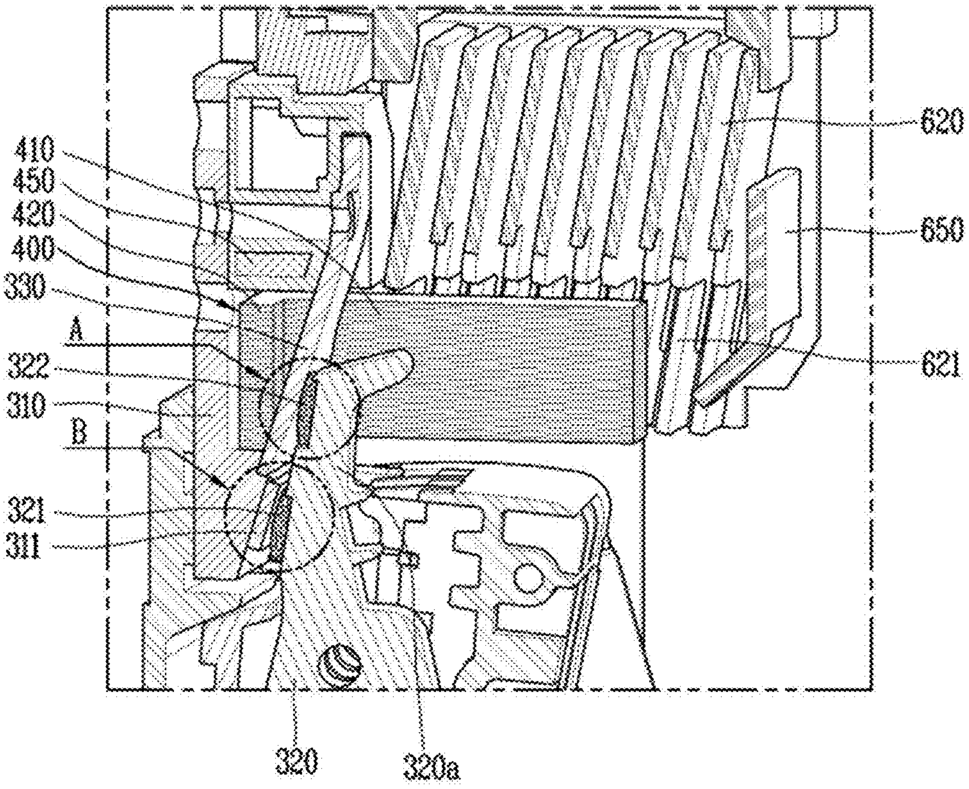
FIG. 25 is a perspective view illustrating a circuit breaking unit and an arc extinguishing unit shown in FIG. 24.
Figure 26:
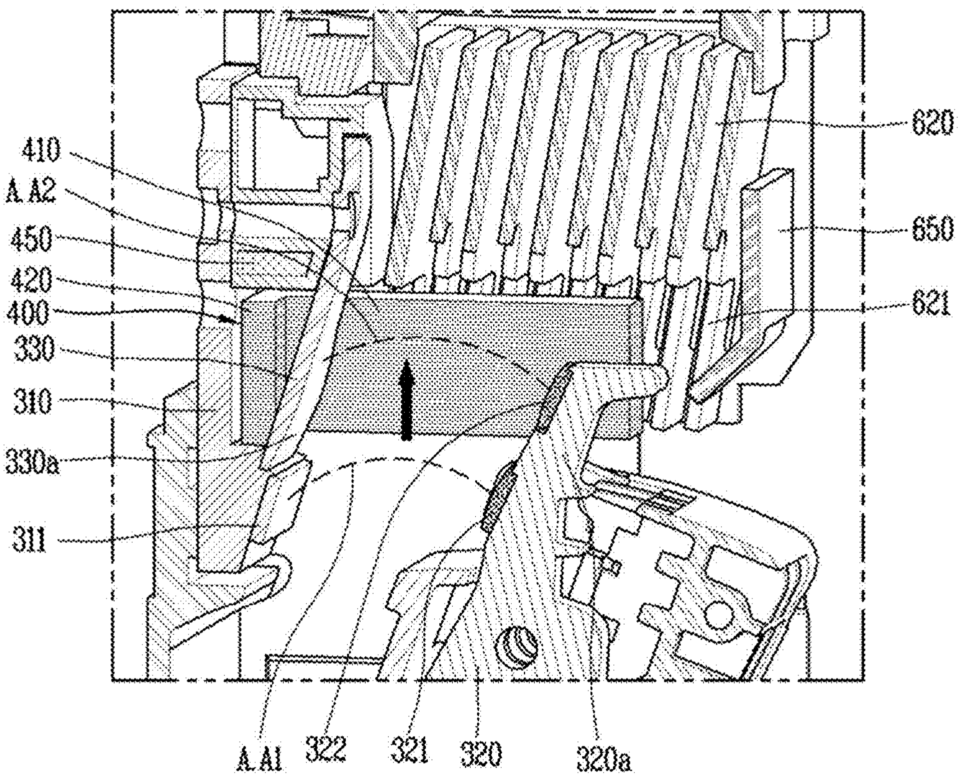
FIG. 26 is a perspective view illustrating a state in which the circuit breaking unit and the arc extinguishing unit shown in FIG. 25 are disposed in a trip state.

The insulator 423 is interposed between the low runner 330 and the fixed contact terminal 310. Referring to FIGS. 22 and 23, the insulator 423 is disposed between magnet units disposed opposite to each other and spaced apart from each other. The insulator 423 may be made of a non-magnetic body. To prevent the strength of the magnetic field formed between the first magnet unit 421 and the second magnet unit 422 from weakening, the insulator 423 may be disposed so as not to magnetically integrate the first magnet unit 421 and the second magnet unit 422. In this case, the insulator 423 may not be provided.

A space 335 may be formed between the insulator 423 and the low runner 330.

Meanwhile, according to another embodiment of the present disclosure, the U magnetic body 420' may include a first magnetic body 421', a second magnetic body 422', and a third magnetic body 423'.

The first magnetic body 421' is disposed on one side of the storage part 412 of the case 411. The first magnetic body 421' is disposed to extend between the arc extinguishing unit 600 and the protruding contact 322 from the fixed contact terminal 310.

The second magnetic body 422' is spaced apart from the first magnetic body 421' and disposed facing the first magnetic body 421'. The second magnetic body 422' is disposed on the other side of the storage part 412 of the case 411 to face the first magnetic body 421'.

The third magnetic body 423' is integrally formed with the first magnetic body 421' and the second magnetic body 422', and is interposed between the low runner 330 and the fixed contact terminal 310.

The first magnetic body 421', the second magnetic body 422', and the third magnetic body 423' may be integrally formed. And, the first magnetic body 421', the second magnetic body 422', and the third magnetic body 423' may be formed by stacking magnetic bodies.

Due to the structure described above, when an arc is formed between the low runner 330 and the protruding contact 322 at the central opening of the case 411, an induced magnetic field may be formed in the U magnetic body 420'.

Specifically, when an arc is generated between the first magnetic body 421' and the second magnetic body 422', an induced magnetic field may be formed along the first magnetic body 421', the second magnetic body 422', and the third magnetic body 423'. At this time, the induced magnetic field induced in the U magnetic body 420' may be formed so that the arc is subjected to the electromagnetic force upward.

The fixing part 430 is disposed between the low runner 330 and the fixed contact terminal 310 and is coupled to the low runner 330 and the fixed contact terminal 310. In addition, the fixing part 430 is coupled to the holder 410 and the fixed contact terminal 310 on the upper side of the holder 410 so that the holder 410 is not separated from the fixed contact terminal 310 and the U magnetic body is not separated from the inner space.

The lower end of the low runner 330 is coupled to the fixed contact terminal 310 and the upper end thereof is spaced apart from the fixed contact terminal 310. In addition, the low runner 330 repeatedly contacts and separates from the protruding contact 322 and may receive an impact when an arc generated is applied.

In this case, since the fixing part 430 is provided between the low runner 330 and the fixed contact terminal 310, the low runner 330 can be stably coupled to the fixed contact terminal 310.

The fixing part 430 may include a gassing material that generates molecules that extinguish the arc when heat generated by the arc is applied.

The gassing material generates molecules capable of extinguishing the arc as the arc is applied. Accordingly, the generated arc can be quickly extinguished.

Specifically, when heat generated by an arc is applied to the gassing material, the gassing material releases molecules capable of extinguishing the arc. In other words, the gassing material can generate gases that can extinguish the arc. Through this, the arc generated in the arc extinguishing unit 600 can be quickly extinguished.

As the fixing part 430 is inserted between the fixed contact terminal 310 and the low runner 330, the fixed contact terminal 310 is disposed on the rear surface and the low runner 330 is disposed on the front surface.

As described above, as the low runner 330 is in contact with and separation from the protruding contact 322, an arc may be generated. In addition, the generated arc may be applied to the low runner 330. Thus, the low runner 330 may be damaged upon application of an arc.

In this case, since the fixing part 430 includes the gassing material, damage to the low runner 330 may be reduced by rapidly extinguishing the arc.

The fixing part 430 may include a first fixing part 431 and a second fixing part 432.

Specifically, the first fixing part 431 may contact the fixed contact terminal 310 and have a width corresponding to the width of the fixed contact terminal 310.

Specifically, as shown in FIG. 20, the width of the fixed contact terminal 310 and the width of the first fixing part 431 may be the same or formed to be the same. Through this, movement of the first fixing part 431 in the left-right direction with respect to the fixed contact terminal 310 can be reduced. In addition, the first fixing part 431 can easily absorb the impact received by the low runner 330.

And, the first fixing part 431 may be formed to surround the lower side surface of the low runner 330.

The second fixing part 432 may be interposed between the first fixing part 431 and the low runner 330. And, the second fixing part 432 may be formed to surround the upper side surface of the low runner 330.

As the second fixing part 432 is formed to surround an upper portion of the low runner 330, as described above, an impact received by the low runner 330 due to contact with and separation from the protruding contact 322 or an impact received when an arc is applied may be absorbed by the second fixing part 432.

A concave portion 4321 may be formed in the second fixing part 432 to surround an upper portion of the low runner 330.

Specifically, referring to FIGS. 20 and 22, the second fixing part 432 has a concave portion 4321 into which the low runner 330 protruding from the fixed contact terminal 310 at a predetermined angle can be inserted.

In this case, one surface forming the concave portion 4321 has a contact surface 4322 in contact with a surface where the upper portion of the low runner 330 faces the fixed contact terminal 310. And, a side surface 4323 may be formed that is perpendicular to the contact surface 4322. A coupling hole **432*a* opened for coupling with the low runner 330 and the fixed contact terminal 310 may be formed in the contact surface 4322**.

The second fixing part 432 has a coupling groove 433 formed to be coupled with the coupling protrusion 413 of the case 411 described above to fix the fixing part 430 to the holder 410.

The circuit breaking unit 300 according to an embodiment of the present disclosure has the fixing part 430 interposed between the fixed contact terminal 310 and the low runner 330, and thus, it is possible to prevent the low runner 330 from shaking or changing its position due to an external force.

In addition, since the fixing part 430 includes a gassing material, when an arc is applied to the low runner 330, there is an advantage in that it can quickly extinguish the arc.

(8) An Air Gap (A.G) and Rising Force of Arc

Figure 21:
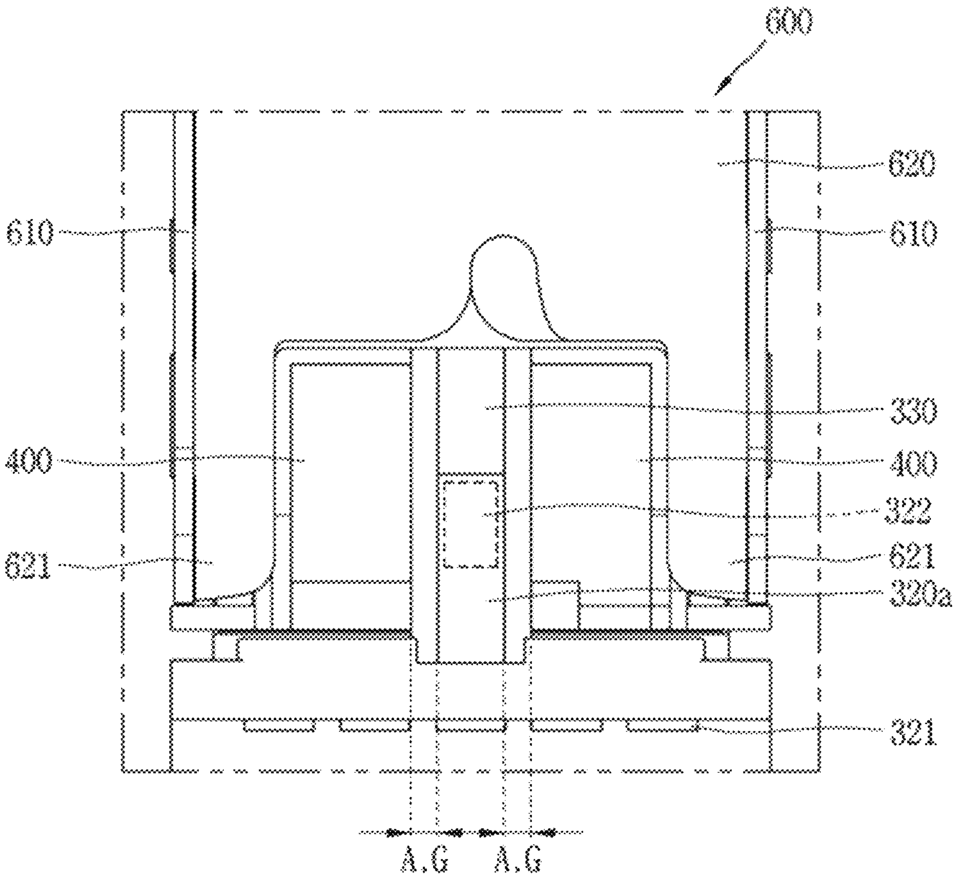
FIG. 21 is a front view illustrating the circuit breaking unit and the arc extinguishing unit shown in FIG. 20.

Referring to FIG. 21, in an embodiment of the present disclosure, the protruding contact 322 may protrude from an upper side of the centrally disposed movable contact 321 among the plurality of movable contacts 321.

Figure 13:
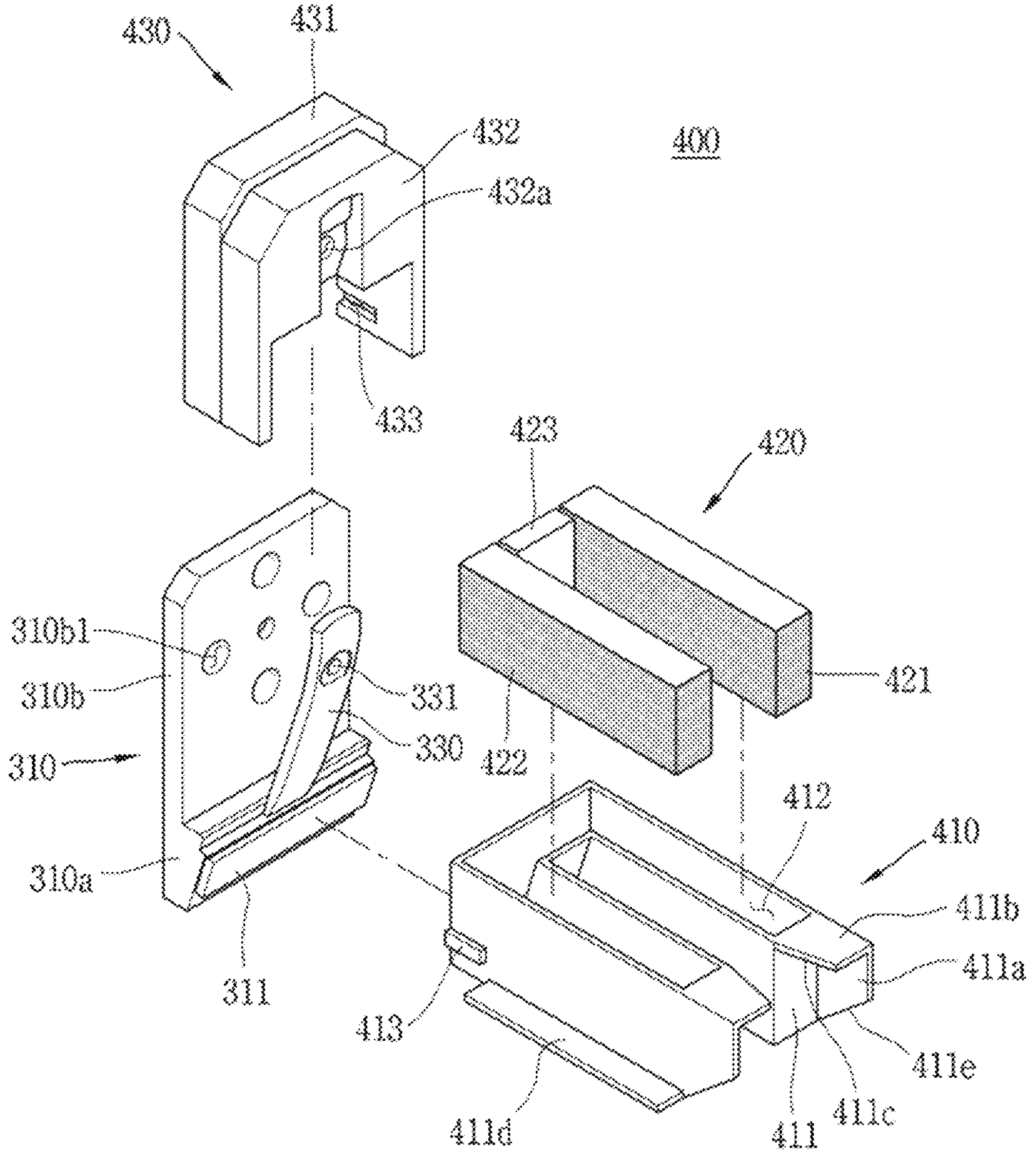
FIGS. 13 and 14 are perspective views illustrating a fixed contact terminal and a U assembly according to an exemplary embodiment of the present disclosure.

As such, referring to FIG. 13, when the protruding contact 322 is formed to protrude from an upper side of the centrally disposed movable contact 321 among the movable contacts 321, an air gap A.G may be formed in relation to the grid legs 621 extending downward from both ends of the grid 620.

A space of the arc-generation area is reduced by forming the air gap A.G, and accordingly, a pressure applied to the generated arc is increased, so that the generated arc may be subjected to a rising force. Accordingly, the arc can be more easily applied to the grid 620 or grid leg 621, so that it can be quickly extinguished.

In addition, referring to FIG. 19, when the U assembly 400 is disposed, an air gap A.G may be formed between the protruding contact 322 and the U assembly 400.

By forming an air gap A.G between the protruding contact 322 and the U assembly 400, a pressure applied to an arc generated between the protruding contact 322 and the low runner 330 may be increased, and thus a force to rise may be applied to the generated arc.

(9) Description of the Arc-Guided Path (A.P) by Magnetic Field

Referring to the FIGS. 22 to 23, a magnetic field formed in the circuit breaking unit 300, electromagnetic force applied to the arc, and an arc-guided path A.P will be described below.

DC air circuit breaker 10 according to an embodiment of the present disclosure breaks direct current flowing from the movable contact 321 (the protruding contact 322) to the fixed contact 311 (the low runner 330), or vice versa. Therefore, the arc generated when tripped is also formed in the same direction as the energized direction.

Meanwhile, the magnetic field affecting the arc may be a magnetic field formed by a permanent magnet. The magnetic field formed by a permanent magnet may form a direction of a magnetic field coming out of the N pole and entering the S pole.

In addition, the ferromagnetic body disposed around the area where the arc is generated may be induced to form a magnetic field in a direction obstructing the magnetic field caused by the current of the generated arc. This can be referred to as an induced magnetic field of a ferromagnetic body.

The arc may be subjected to an electromagnetic force by a magnetic field formed by a permanent magnet or an induced magnetic field by a ferromagnetic body.

The direction of the electromagnetic force received by the generated arc can be explained by Fleming's left-hand rule. According to Fleming's left-hand rule, when you point the third finger in the direction of the current (I) and the second finger in the direction of the magnetic field (B), the direction of the thumb is the direction of the electromagnetic force (F). Here, the angle between each finger should be a right angle.

At this time, according to Fleming's left-hand rule, the arc may move along the direction of the electromagnetic force received by the arc. This motion of the arc may be referred to as an arc-guided path (A.P).

Figure 14:
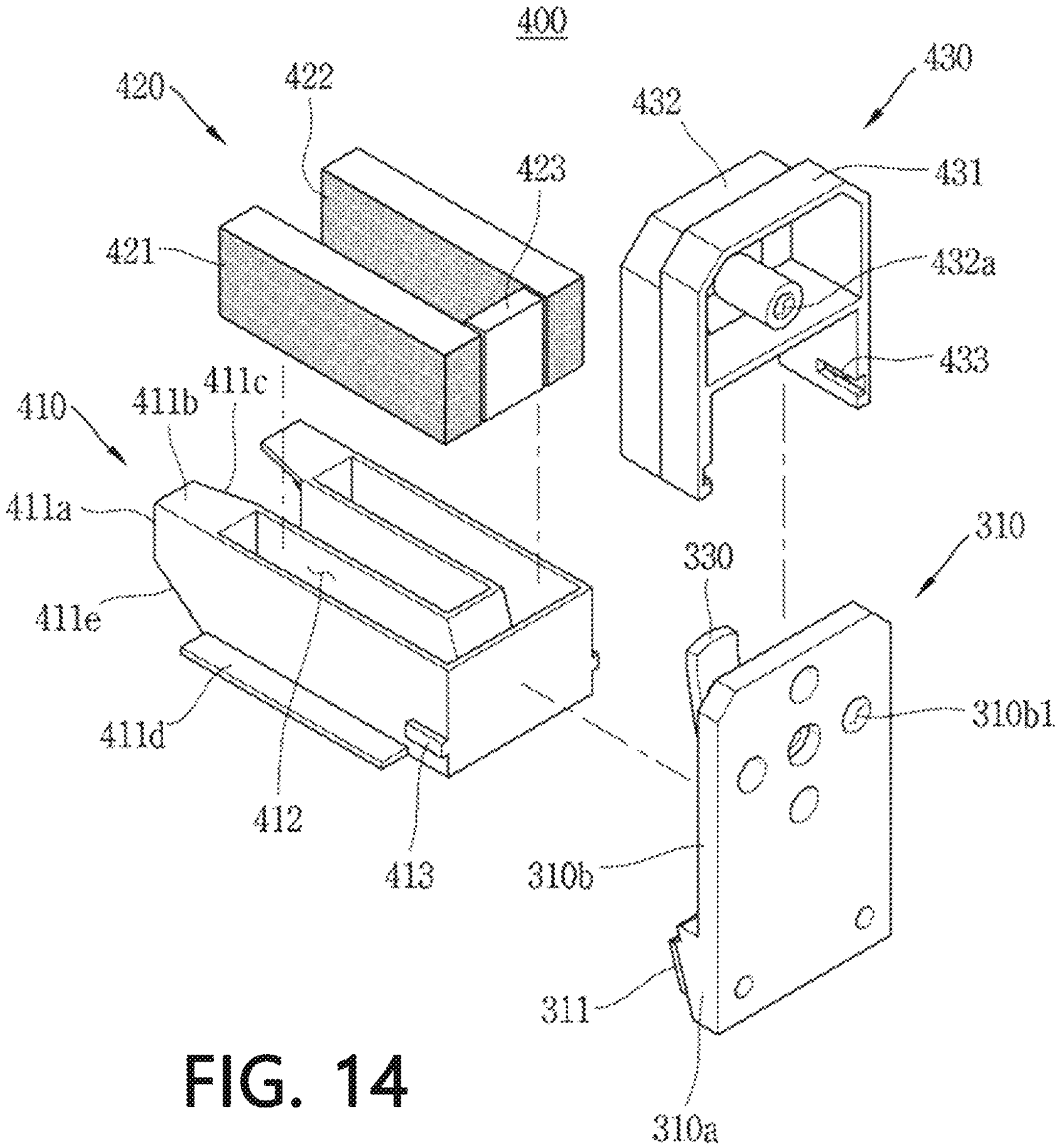

FIGS. 13 and 14 show an embodiment in which the U magnetic body 420 of the U assembly 400 is made of a permanent magnet, and FIG. 22 shows a magnetic field formed by a permanent magnet and an arc-guided path (A.P) accordingly in the embodiment.

Referring to FIG. 22(*a*), the direction of the current of the arc generated when the air circuit breaker 10 is tripped flows from the movable contact 321 (the protruding contact 322) toward the fixed contact 311 (the low runner 330).

In this case, the N pole is disposed in a direction of the first magnet unit 421 facing the second magnet unit 422, and the S pole is disposed in a direction of the second magnet unit 422 facing the first magnet unit 421. Accordingly, a magnetic field B2 is formed from the first magnet unit 421 toward the second magnet unit 422 between the first magnet unit 421 and the second magnet unit 422.

In this case, the arc is subjected to an electromagnetic force toward the arc extinguishing unit 600, i.e., the upper side, according to Fleming's left-hand rule. Accordingly, an arc-guided path A.P is formed in an upward direction. As the arc-guided path A.P is formed toward the arc extinguishing unit 600, the arc that lacks rising force due to the small current can be raised by receiving the electromagnetic force. Accordingly, the arc can be extinguished more quickly.

Referring to FIG. 22(*b*), the direction of the current of the arc generated when the air circuit breaker 10 is tripped flows from the fixed contact 311 (the low runner 330) toward the movable contact 321 (the protruding contact 322).

In this case, the S pole is disposed in a direction of the first magnet unit 421 facing the second magnet unit 422, and the N pole is disposed in a direction of the second magnet unit 422 facing the first magnet unit 421. Accordingly, a magnetic field B2 is formed from the second magnet unit 422 toward the first magnet unit 421 between the first magnet unit 421 and the second magnet unit 422.

In this case, the arc is subjected to an electromagnetic force toward the arc extinguishing unit 600, i.e., the upper side, according to Fleming's left-hand rule. Accordingly, an arc-guided path A.P is formed in an upward direction. As the arc-guided path A.P is formed toward the arc extinguishing unit 600, the arc that lacks rising force due to the small current can be raised by receiving the electromagnetic force. Accordingly, the arc can be extinguished more quickly.

The air circuit breaker 10 according to an embodiment of the present disclosure can form a strong magnetic field inside the U assembly 400 through a permanent magnet. Accordingly, there is an advantage in that a strong electromagnetic force can be applied to the generated arc.

In the embodiment described in FIG. 22, since the permanent magnet forms a fixed magnetic field, this embodiment can be used when the direction of the current connected to the air circuit breaker 10 is set in advance or the direction of the current connected to the air circuit breaker 10 is guided in a specific direction.

Figure 15:
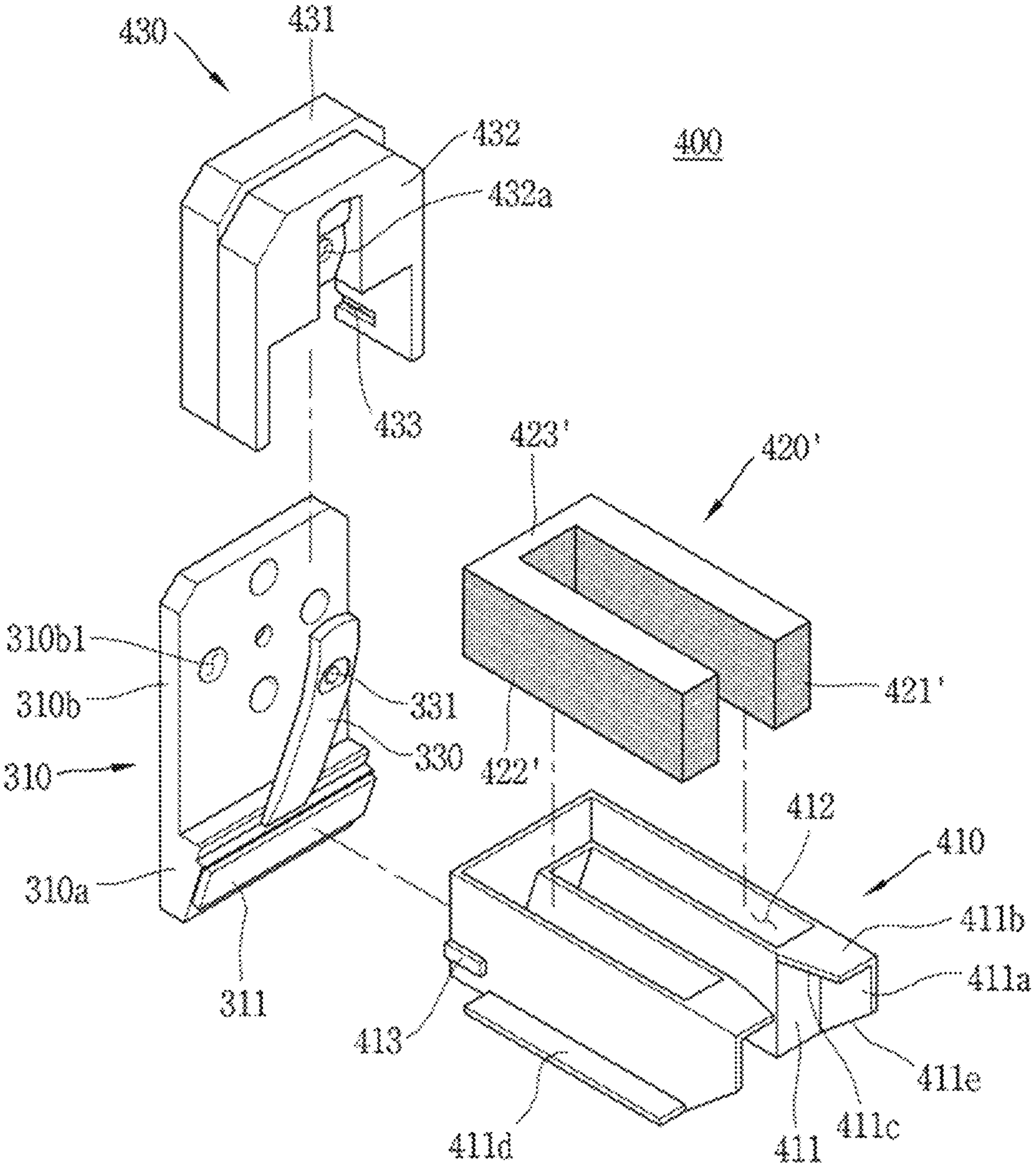
FIGS. 15 and 16 are perspective views illustrating a fixed contact terminal and a U assembly according to another exemplary embodiment of the present disclosure.
Figure 16:
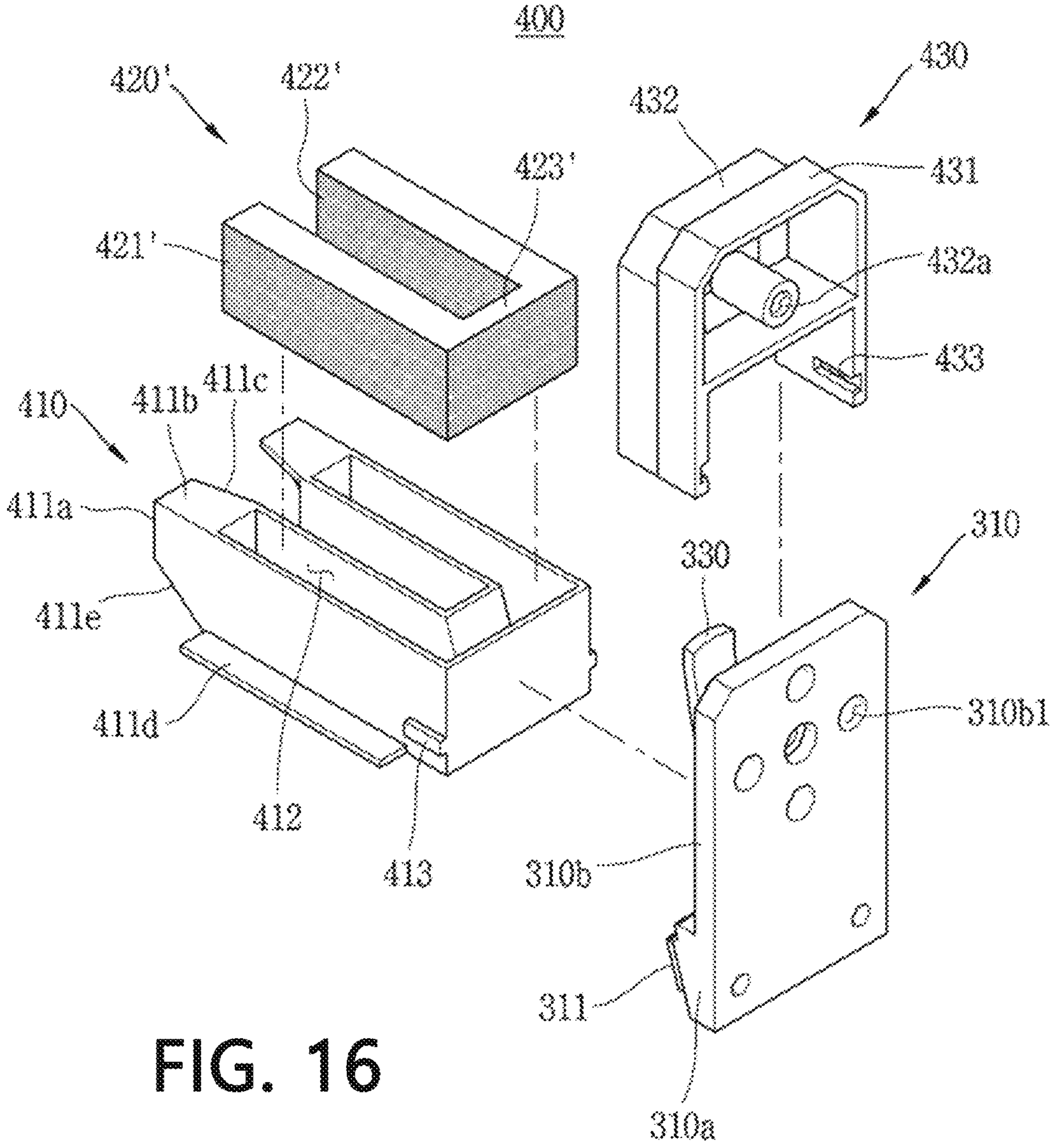

FIGS. 15 and 16 show an embodiment in which the U magnetic body 420' of the U assembly 400 is made of a ferromagnetic body, and FIG. 23 shows a magnetic field induced in the ferromagnetic body and an arc-guided path (A.P') accordingly in the embodiment.

Referring to FIG. 23(*a*), the direction of the current of the arc generated when the air circuit breaker 10 is tripped flows from the movable contact 321 (the protruding contact 322) toward the fixed contact 311 (the low runner 330). In this case, a magnetic field B1 is formed in a direction surrounding the arc generated by Ampere's right-handed screw rule.

A magnetic field B2 induced in a direction obstructing the magnetic field B1 generated by the arc is generated in the ferromagnetic body. At this time, instantaneously, the first magnetic body 421' may be magnetized to the N pole, and the second magnetic body 422' may be magnetized to the S pole.

And, by the induced magnetic field B2, the arc is subjected to an electromagnetic force toward the arc extinguishing unit 600, i.e., the upper side, according to Fleming's left-hand rule. Accordingly, an arc-guided path A.P is formed in an upward direction. As the arc-guided path A.P is formed toward the arc extinguishing unit 600, the arc that lacks rising force due to the small current can be raised by receiving the electromagnetic force. Accordingly, the arc can be extinguished more quickly.

Referring to FIG. 23(*a*), the direction of the current of the arc generated when the air circuit breaker 10 is tripped flows from the fixed contact 311 (the low runner 330) toward the movable contact 321 (the protruding contact 322). In this case, a magnetic field B1 is formed in a direction surrounding the arc generated by Ampere's right-handed screw rule.

A magnetic field B2 induced in a direction obstructing the magnetic field B1 generated by the arc is generated in the ferromagnetic body. At this time, instantaneously, the second magnetic body 422' may be magnetized to the N pole, and the first magnetic body 421' may be magnetized to the S pole.

And, by the induced magnetic field B2, the arc is subjected to an electromagnetic force toward the arc extinguishing unit 600, i.e., the upper side, according to Fleming's left-hand rule. Accordingly, an arc-guided path A.P is formed in an upward direction. As the arc-guided path A.P is formed toward the arc extinguishing unit 600, the arc that lacks rising force due to the small current can be raised by receiving the electromagnetic force. Accordingly, the arc can be extinguished more quickly.

The air circuit breaker 10 according to an embodiment of the present disclosure includes a U magnetic body 420' that forms a magnetic field induced in a direction obstructing the magnetic field formed by the arc. The arc receives electromagnetic force toward the arc extinguishing unit 600 by the induced magnetic field formed by the U magnetic body 420'. Accordingly, the arc can be more easily applied to the arc extinguishing unit 600 and extinguished.

In addition, the U magnetic body 420' of the air circuit breaker 10 according to an embodiment of the present disclosure forms a magnetic field induced to receive an electromagnetic force toward the arc extinguishing unit 600 regardless of the current direction of the arc, and thus, there is an advantage in that the arc can always be guided toward the arc extinguishing unit 600 regardless of the direction of the DC current connected to the air circuit breaker 10.

3. Description of a Configuration of an Air Circuit Breaker 10 According to Another Embodiment of the Present Disclosure Hereinafter, an air circuit breaker 10 according to another exemplary embodiment of the present disclosure will be described with reference to FIGS. 24 to 33.

The air circuit breaker 10 according to the present embodiment includes a cover unit 100, a driving unit 200, a circuit breaking unit 300, a U assembly 400, and an arc extinguishing unit 600.

Among them, the cover unit 100, the driving unit 200, the circuit breaking unit 300, and the arc extinguishing unit 600 has the same structure and function as the cover unit 100, the driving unit 200, the circuit breaking unit 300, and the arc extinguishing unit 600 according to the above-described embodiment.

However, the U assembly 400 according to the present embodiment has some differences from the U assembly 400 according to the above-described embodiment in its structure and function. Hereinafter, the U assembly 400 according to the present embodiment will be described focusing on the above differences.

(1) Description of the Magnet Unit 450

The U assembly according to the present embodiment includes a magnet unit 450.

The magnet unit 450 according to an embodiment of the present disclosure is disposed between the low runner 330 and the fixed contact terminal 310.

The magnet unit 450 includes a first surface 451 magnetized to the N pole and a second surface 452 magnetized to the S pole, and the first surface 451 of the magnet unit 450 is disposed in a direction toward the fixed contact 311, and the second surface 452 is disposed in a direction opposite to the first surface 451.

Figure 27:
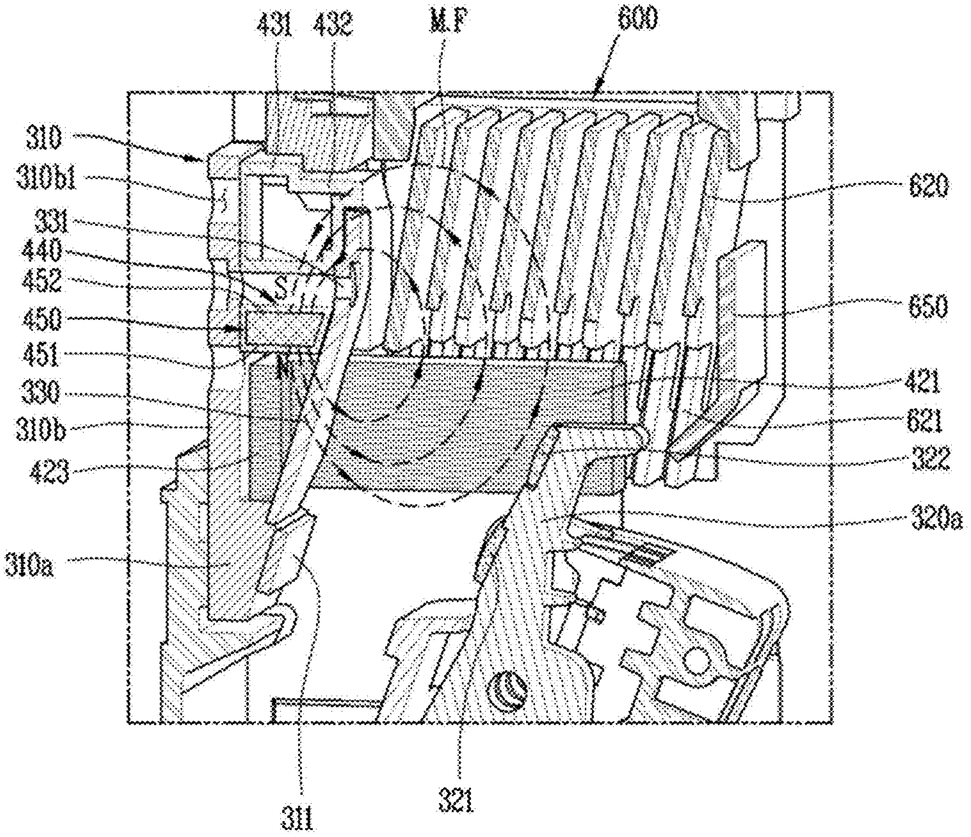
FIG. 27 is a perspective view showing a magnetic field of a magnet unit in the circuit breaking unit and the arc extinguishing unit shown in FIG. 26.

Specifically, referring to FIG. 27, the first surface 451 of the magnet unit 450 is disposed in a direction toward the fixed contact 311, and the second surface 452 is disposed in a direction opposite to the fixed contact 311. Through this, a magnetic field formed by the magnet unit 450 may be formed between the low runner 330 and the protruding contact 322, that is, in a direction toward the upper side in the magnetic field area.

That is, a magnetic field formed by the magnet unit 450 is formed between the low runner 330 and the protruding contact 322 in a direction from the movable contact 321 toward the grid 620.

Accordingly, an arc formed between the low runner 330 and the protruding contact 322 is affected by a magnetic field formed in a direction toward the arc extinguishing unit 600.

In addition, the magnet unit 450 is disposed to overlap at least a portion of the grid 620. Referring to FIG. 27, since the magnet unit 450 is disposed above the U assembly 400, the grid leg 621 is disposed to overlap at least a portion of the grid 620 disposed while surrounding the U assembly 400.

Accordingly, when the arc rises upward by the electromagnetic force, since the magnetic field by the magnet unit 450 becomes stronger, the force for the arc to rise may become stronger. Accordingly, the arc can be more easily applied to the grid 620.

However, unlike the above described, in another embodiment of the present disclosure, the magnet unit 450 includes a first surface 451 magnetized to the N pole and a second surface 452 magnetized to the S pole, and the second surface 452 of the magnet unit 450 may be disposed in a direction toward the fixed contact 311, and the first surface 451 may be disposed in a direction opposite to the second surface 452.

In this case, a magnetic field formed by the magnet unit 450 may be formed in a direction from the arc extinguishing unit 600 toward the movable contact terminal 320. That is, a magnetic field formed by the magnet unit 450 may be formed in a direction from top to bottom with respect to FIG. 27.

Accordingly, an arc formed between the low runner 330 and the protruding contact 322 is affected by a magnetic field formed in a downward direction from the arc extinguishing unit 600.

In addition, the U assembly 400 is disposed below the magnet unit 450. That is, the magnet unit 450 is disposed above the third magnetic body 423'.

Through the above-described structure, the present disclosure utilizes the space between the low runner 330 and the fixed contact terminal 310 by using the U assembly 400 and at the same time arranges the magnet unit 450 in the space disposed above the U assembly 400, and thus, there is an advantage in that a space required for arranging the magnet unit 450 is not excessively increased, and excessive design changes are not required.

The magnet unit 450 is disposed inside the fixing part 430. The low runner 330 is disposed on the front surface of the magnet unit 450, and the fixed contact terminal 310 is disposed on the rear surface.

Figure 28:
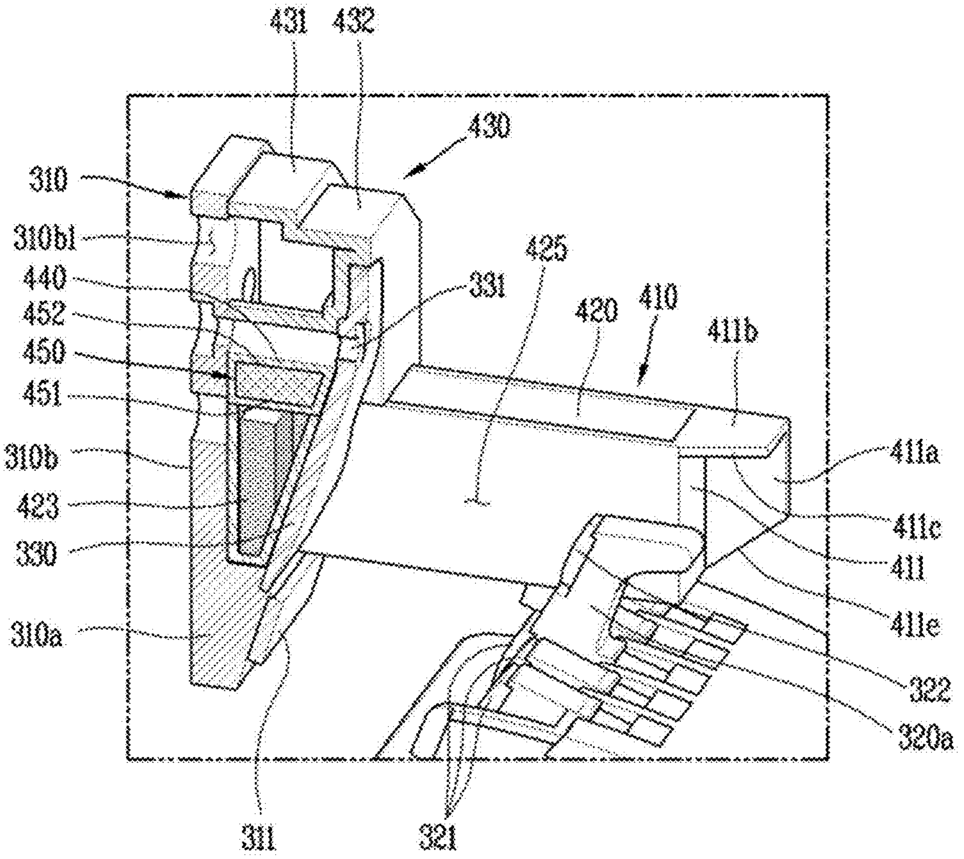
FIG. 28 is a cross-sectional perspective view of a fixed contact terminal and a movable contact terminal shown in FIG. 27.
Figure 29:
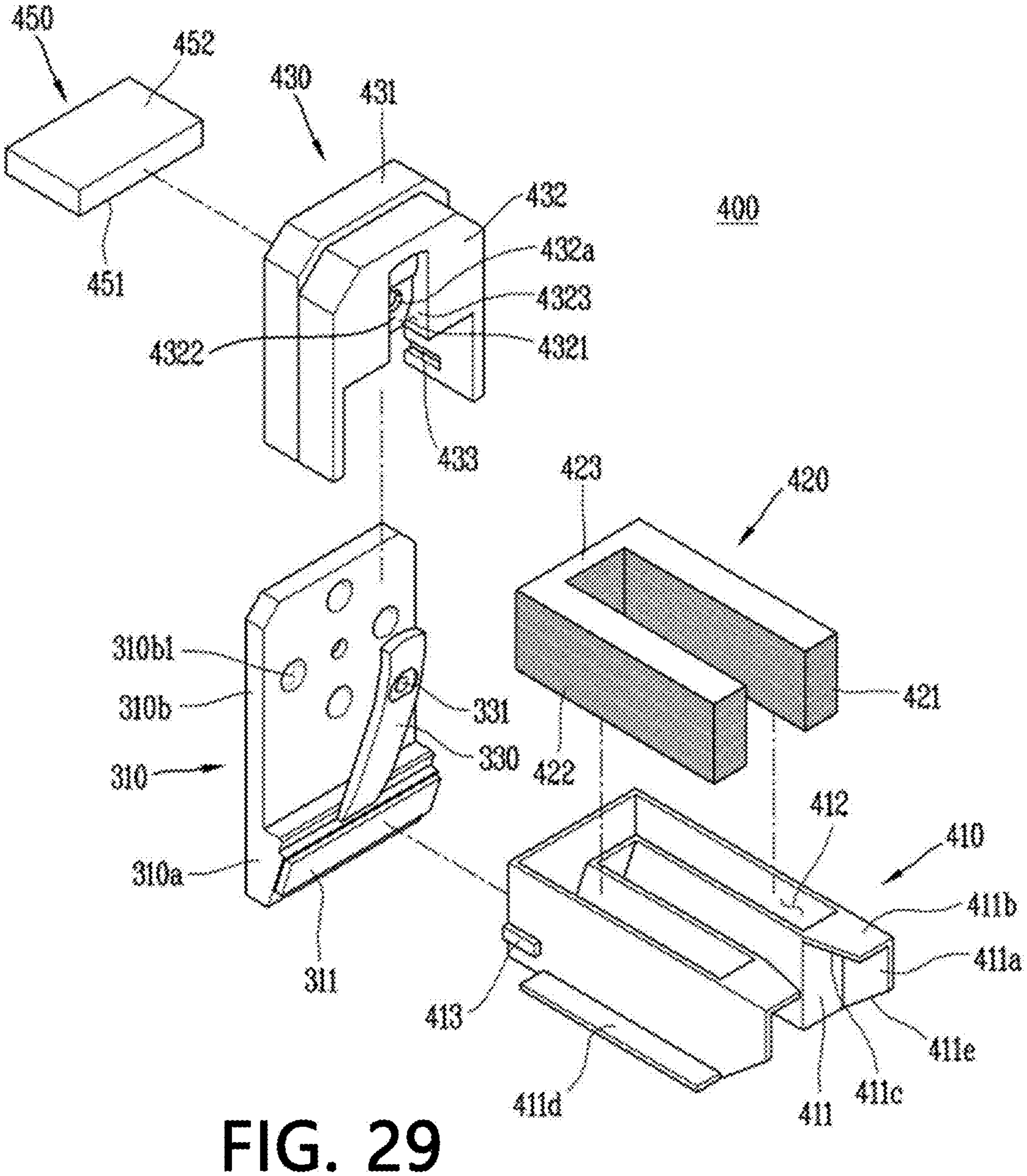
FIGS. 29 and 30 are exploded perspective views illustrating a fixed contact terminal, U assembly, and a magnet unit according to another exemplary embodiment of the present disclosure.
Figure 30:
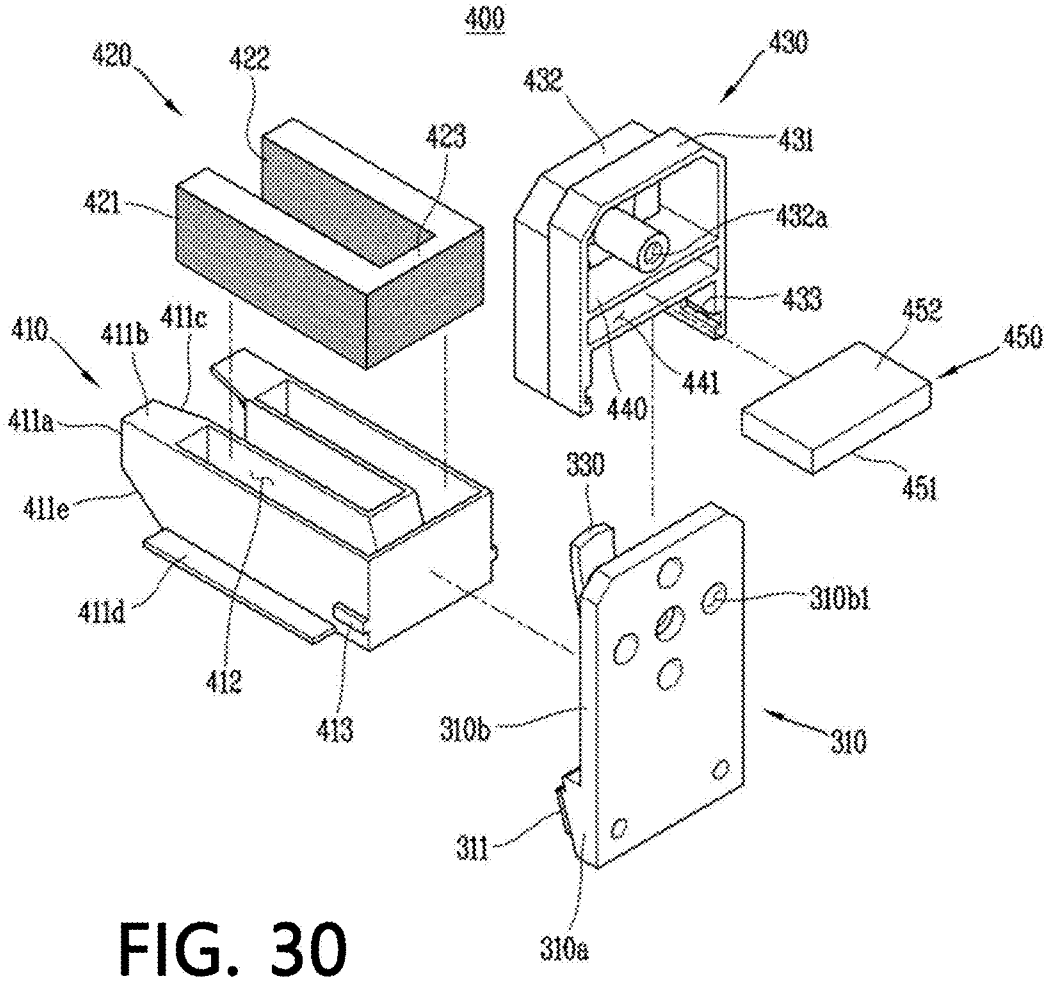

Specifically, referring to FIGS. 28 to 30, the magnet unit 450 is inserted and disposed into the rear surface of the first fixing part 431 and the second fixing part 432.

A storage space 441 in which the magnet unit 450 can be stored is formed on the rear surface of the first fixing part 431. An insulating part 440 forming the storage space 441 on the rear surface of the first fixing part 431 protrudes in the horizontal direction to connect both side surfaces of the first fixing part 431 to each other.

The magnet unit 450 is inserted into the storage space 441.

Surfaces surrounding the magnet unit 450 may protect the magnet unit 450 from an arc. Specifically, the front surface of the magnet unit 450 is protected by the fixing part 430. The rear surface of the magnet unit 450 may be protected by the fixed contact terminal 310. Alternatively, a cover having insulation performance may be further added between the rear surface of the magnet unit 450 and the fixed contact terminal 310. The top surface, bottom surface and both side surfaces of the magnet unit 450 may also be protected by the fixing part 430.

Accordingly, even when an arc generated between the protruding contact 322 and the low runner 330 is applied to and transferred to the low runner 330, the magnet unit 450 is protected by the fixing part 430, and thus, it is possible to prevent the magnet unit 450 from being burned by the heat of the arc.

However, unlike the above described, in other embodiments, the storage space 441 formed on the rear surface of the first fixing part 431 may be formed in various shapes.

(2) Description of the Arc-Guided Path (A.P) by Magnetic Field

Referring to the FIGS. 31 to 33, a magnetic field formed in the circuit breaking unit 300, electromagnetic force applied to the arc, and an arc-guided path A.P will be described below.

In the following description, the part marked with "⊙" means that the current (arc) flows in a direction of coming out of the paper. In addition, the part marked with "⊗" means that the current (arc) flows in a direction of entering toward the paper.

DC air circuit breaker 10 according to an embodiment of the present disclosure breaks direct current flowing from the movable contact 321 (the protruding contact 322) to the fixed contact 311 (the low runner 330), or vice versa. Therefore, the arc generated when tripped is also formed in the same direction as the energized direction.

Meanwhile, the magnetic field affecting the arc may be a magnetic field formed by a permanent magnet. The magnetic field formed by a permanent magnet may form a direction of a magnetic field coming out of the N pole and entering the S pole. With this magnetic field, the arc may be subjected to an electromagnetic force due to the Lorentz force.

In addition, the ferromagnetic body disposed around the area where the arc is generated may be induced to form a magnetic field in a direction obstructing the magnetic field caused by the current of the generated arc. This can be referred to as an induced magnetic field of a ferromagnetic body.

The arc may be subjected to an electromagnetic force by Lorentz force by a magnetic field formed by a permanent magnet or an induced magnetic field by a ferromagnetic body.

The direction of the electromagnetic force received by the generated arc can be explained by Fleming's left-hand rule.

Figure 32:
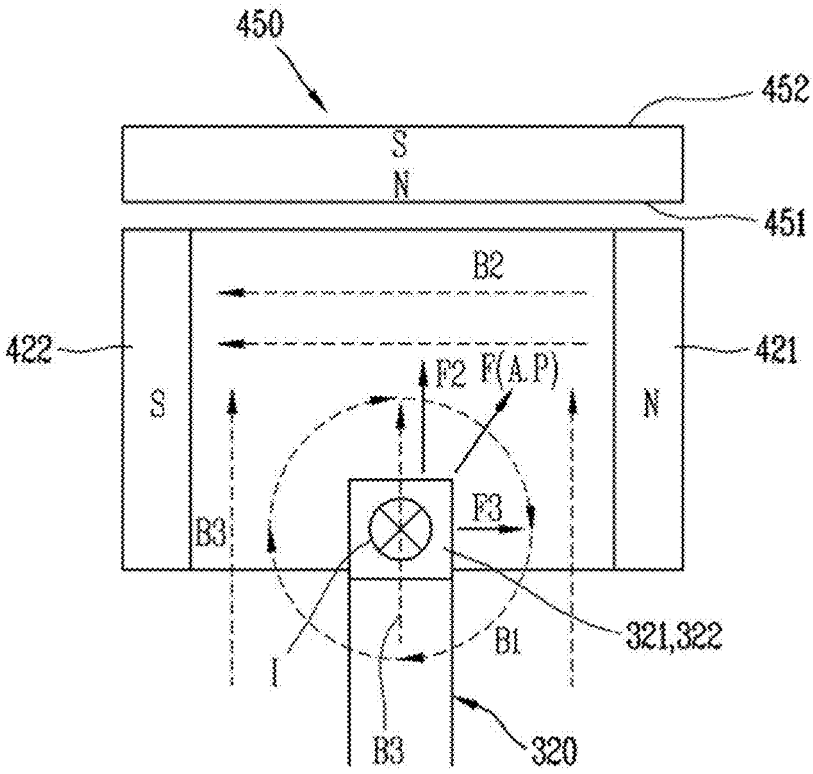
Figure 33:
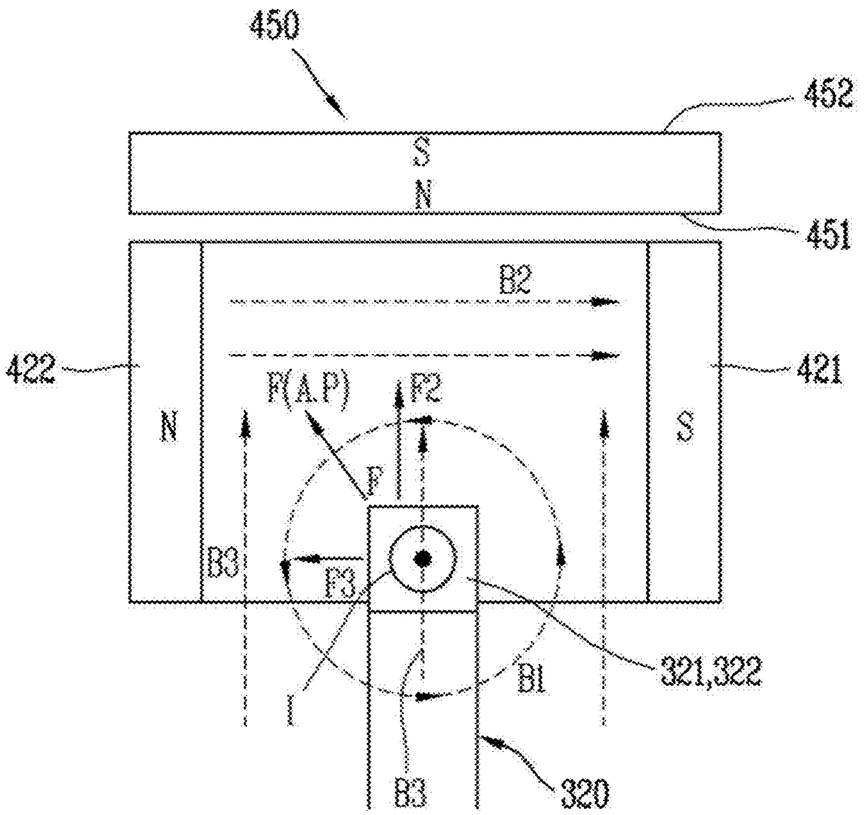

FIGS. 31 to 33 are drawings for explaining a direction in which a magnetic field is induced in the U magnetic body 420' by the generated arc and the electromagnetic force by the magnet unit 450 and the U magnetic body 420' is applied to the generated arc.

Referring to FIG. 31(*a*) and FIG. 32, the direction of the current of the arc generated when the air circuit breaker 10 is tripped flows from the movable contact 321 (the protruding contact 322) toward the fixed contact 311 (the low runner 330). That is, in FIG. 32, the current (arc) is formed in a direction of entering toward the paper.

In this case, due to the current direction of the arc, a magnetic field B1 is formed in a direction surrounding the arc generated by Ampere's right-handed screw rule.

A magnetic field B2 induced in a direction obstructing the magnetic field B1 generated by the arc is generated in the U magnetic body 420'. At this time, instantaneously, the first magnetic body 421' may be magnetized to the N pole, and the second magnetic body 422' may be magnetized to the S pole.

And, by the induced magnetic field B2, the arc is subjected to an electromagnetic force F2 toward the arc extinguishing unit 600, i.e., the upper side, according to Fleming's left-hand rule.

Meanwhile, the arc may be subjected to an electromagnetic force due to a magnetic field B3 formed by the magnet unit 450. Even at this time, according to Fleming's left-hand rule in consideration of the current direction of the arc and the direction of the magnetic field B3 formed by the magnet unit 450, the arc is subjected to an electromagnetic force F3 in the right direction.

In this case, the net force of the electromagnetic force applied to the arc is a resultant force F of the electromagnetic force F2 by the magnetic field B2 induced by the U magnetic body 420' and the electromagnetic force F3 by the magnetic field B3 by the magnet unit 450. That is, an arc-guided path A.P applied to the arc may be formed in a direction toward the upper right side.

As such, the arc may be applied toward the grid 620 or the grid leg 621 of the arc extinguishing unit 600 by forming the arc-guided path A.P.

The circuit breaking unit 300 and the air circuit breaker 10 including the same according to an embodiment of the present disclosure form an arc-guided path A.P toward the grid 620 through the electromagnetic force applied to the arc by the magnetic field induced in the U magnetic body 420' and the magnetic field by the magnet unit 450. Through this, the arc, which has insufficient force to rise due to the small current, can be raised by receiving the electromagnetic force. Accordingly, the arc can be extinguished more quickly.

Referring to FIG. 31(*b*) and FIG. 33, the direction of the current of the arc generated when the air circuit breaker 10 is tripped flows from the fixed contact 311 (the low runner 330) toward the movable contact 321 (the protruding contact 322). That is, referring to FIG. 32, the current (arc) is formed in a direction of coming out of the paper.

In this case, due to the current direction of the arc, a magnetic field B1 is formed in a direction surrounding the arc generated by Ampere's right-handed screw rule.

A magnetic field B2 induced in a direction obstructing the magnetic field B1 generated by the arc is generated in the U magnetic body 420'. At this time, instantaneously, the second magnetic body 422' may be magnetized to the N pole, and the first magnetic body 421' may be magnetized to the S pole.

And, by the magnetic field B2 induced in the U magnetic body 420', the arc is subjected to an electromagnetic force F2 toward the arc extinguishing unit 600, i.e., the upper side, according to Fleming's left-hand rule.

In addition, the magnetic field B3 formed by the magnet unit 450 is formed upward with respect to the arc. According to Fleming's left-hand rule in consideration of the current direction of the arc and the direction of the magnetic field B3 formed by the magnet unit 450, the electromagnetic force F3 applied to the arc by the magnetic field B3 formed by the magnet unit 450 is in the left direction.

In this case, the net force of the electromagnetic force applied to the arc is a resultant force F of the electromagnetic force F2 by the magnetic field B2 induced by the U magnetic body 420' and the electromagnetic force F3 by the magnetic field B3 by the magnet unit 450. That is, an arc-guided path A.P applied to the arc may be formed in a direction toward the upper left side.

As the electromagnetic force is applied to the arc to move along the arc-guided path A.P, the arc may be applied toward the grid 620 or the grid leg 621 of the arc extinguishing unit 600.

The circuit breaking unit 300 and the air circuit breaker 10 including the same according to an embodiment of the present disclosure form an arc-guided path A.P toward the grid 620 through the electromagnetic force applied to the arc by the magnetic field B2 induced in the U magnetic body 420' and the magnetic field B3 by the magnet unit 450. Through this, the arc, which has insufficient force to rise due to the small current, can be raised by receiving the electromagnetic force. Accordingly, the arc can be extinguished more quickly.

In addition, in the circuit breaking unit 300 and the air circuit breaker 10 including the same according to an embodiment of the present disclosure, the arc is subjected to an electromagnetic force upward by the magnetic field formed by the magnetic field induced in the U magnetic body 420'. And, by the magnet unit 450 disposed above the U magnetic body 420' (U assembly 400), the arc is subjected to an electromagnetic force to the right or left depending on the flow direction of the current.

Accordingly, as a resultant electromagnetic force by the U magnetic body 420' (U assembly 400) and the magnet unit 450, an arc-guided path A.P is formed in the upper left or upper right direction in the arc, and thus, there is an advantage in that an arc can be easily applied to the grid leg 621 of the arc extinguishing unit 600 and extinguished quickly.

Meanwhile, in another embodiment of the present disclosure, the magnet unit 450 includes a first surface 451 magnetized to the N pole and a second surface 452 magnetized to the S pole, and the second surface 452 of the magnet unit 450 may be disposed in a direction toward the fixed contact 311, and the first surface 451 may be disposed in a direction opposite to the second surface 452.

Accordingly, the magnetic field formed by the magnet unit 450 may be opposite to that in the above-described embodiment. Specifically, the magnetic field formed by the magnet unit 450 may be formed in the direction of the movable contact 321 and the fixed contact 311 from the arc extinguishing unit 600 centering on the arc.

In this case, the electromagnetic force received by the arc due to the magnetic field formed by the magnet unit 450 is in a direction opposite to that in the above-described embodiment.

Specifically, when the arc is formed in a direction of entering toward the paper as shown in FIG. 32, the electromagnetic force due to the magnetic field of the magnet unit 450 may be formed in a left direction.

And, when the arc is formed in a direction of coming out of the paper as shown in FIG. 33, the electromagnetic force due to the magnetic field of the magnet unit 450 may be formed in a right direction.

That is, even when the second surface 452 of the magnet unit 450 is disposed in a direction toward the fixed contact 311 and the first surface 451 is disposed in an opposite direction to the second surface 452, regardless of the current direction of the arc, the direction of the electromagnetic force by the magnetic field of the magnet unit 450 is such that the arc is directed toward the grid leg 621 and/or the grid 620.

Although the above has been described with reference to preferred embodiments of the present disclosure, it will be understood that those skilled in the art can variously modify and change the present disclosure without departing from the idea and scope of the present disclosure described in the claims below.

What is claimed is:

1. A circuit breaking unit, comprising:
- a fixed contact;
- a movable contact that is in contact with or spaced apart from the fixed contact;
- a protruding contact spaced apart from the movable contact;
- a fixed contact terminal having the fixed contact disposed at a lower end thereof and extending upward;
- a movable contact terminal on which the movable contact is disposed and configured such that the movable contact moves in a direction toward the fixed contact or in a direction away from the fixed contact;
- a low runner disposed extending in a direction away from the fixed contact, one end thereof coupled to the fixed contact terminal, and the other end thereof spaced apart from the fixed contact terminal;
- a holder disposed between the low runner and the fixed contact terminal, extending away from the fixed contact terminal, extending toward the movable contact, having a space formed therein, and protruding from both sides of the low runner; and
- a U magnetic body stored in an inner space of the holder and made of a permanent magnet,
- wherein the holder is formed to extend to both sides of the low runner so that when an arc is generated in an arc-generation area, a pressure applied to the arc is increased as the arc-generation area is reduced by an air gap formed between the protruding contact and the holder, and
- wherein the U magnetic body comprises a magnet unit disposed to be extending from the fixed contact terminal between the protruding contact and an arc extinguishing unit disposed above the protruding contact, and disposed to face each other.

2. The circuit breaking unit of claim 1, further comprising
- a fixing part coupled to the holder and the fixed contact terminal so that the holder is not separated from the fixed contact terminal and the U magnetic body is not separated from the inner space.

3. The circuit breaking unit of claim 2, wherein the U magnetic body further comprises:
- an insulator interposed between the low runner and the fixed contact terminal and disposed between the magnet unit.

4. The circuit breaking unit of claim 3, wherein the magnet unit is disposed such that surfaces facing each other have different polarities.

5. The circuit breaking unit of claim 4, wherein the magnet unit is disposed so that the arc generated during a trip mechanism of the movable contact and the fixed contact is subjected to an electromagnetic force toward the arc extinguishing unit.

6. The circuit breaking unit of claim 2, wherein the holder comprises a gassing material that generates molecules that extinguish the arc when heat generated by the arc is applied.

7. The circuit breaking unit of claim 1, wherein the protruding contact is disposed extending upward from the movable contact, energized when in contact with the low runner, and spaced apart from the low runner when the movable contact is tripped.

8. The circuit breaking unit of claim 7, wherein the protruding contact extends upward so as to overlap at least a portion of a side plate of the arc extinguishing unit.

9. The circuit breaking unit of claim 8, wherein the holder extends between the arc extinguishing unit and the protruding contact from both sides of the low runner.

10. The circuit breaking unit of claim 9, wherein the holder extends to surround a side surface of the protruding contact when the protruding contact is disposed in a trip state.

11. The circuit breaking unit of claim 10, wherein the air gap is a separation space.

12. A circuit breaking unit, comprising:

a fixed contact;

a movable contact that is in contact with or spaced apart from the fixed contact;

a protruding contact spaced apart from the movable contact;

a fixed contact terminal having the fixed contact disposed at a lower end thereof and extending upward;

a movable contact terminal on which the movable contact is disposed and configured such that the movable contact moves in a direction toward the fixed contact or in a direction away from the fixed contact;

a low runner disposed extending in a direction away from the fixed contact, one end thereof coupled to the fixed contact terminal, and the other end thereof spaced apart from the fixed contact terminal; and a magnet unit disposed between the low runner and the fixed contact terminal and forming a magnetic field so that a generated arc is subjected to an electromagnetic force toward an arc extinguishing unit disposed above the protruding contact, and wherein the magnet unit comprises:

a first surface magnetized to a N pole; and a second surface magnetized to a S pole, and wherein one of the first surface and the second surface of the magnet unit is disposed in a direction toward the fixed contact, and the other surface is disposed in a direction opposite to the one surface.

13. The circuit breaking unit of claim 12, wherein the first surface of the magnet unit is disposed in a direction toward the fixed contact, and the second surface is disposed in a direction opposite to the first surface.

14. The circuit breaking unit of claim 12, wherein the second surface of the magnet unit is disposed in a direction toward the fixed contact, and the first surface is disposed in a direction opposite to the second surface.

15. The circuit breaking unit of claim 12, further comprising a holder disposed between the low runner and the fixed contact terminal, extending away from the fixed contact terminal, extending toward the movable contact, having a space formed therein, and protruding from both sides of the low runner, wherein the holder is disposed under the magnet unit.

16. The circuit breaking unit of claim 15, wherein the holder is formed to extend to both sides of the low runner so that when an arc is generated, a pressure applied to the arc is increased.

17. The circuit breaking unit of claim 15, further comprising:

a U magnetic body stored in the inner space of the holder and made of a ferromagnetic body; and a fixing part coupled to the holder and the fixed contact terminal so that the holder is not separated from the fixed contact terminal and the U magnetic body is not separated from the inner space.

18. The circuit breaking unit of claim 17, wherein the magnet unit is disposed inside the fixing part, and the low runner is disposed on a front surface of the magnet unit, and the fixed contact terminal is disposed on a rear surface of the magnet unit.

19. The circuit breaking unit of claim 17, wherein the U magnetic body comprises:

a first magnetic body disposed to be extending from the fixed contact terminal between a protruding contact and an arc extinguishing unit disposed above the protruding contact;

a second magnetic body spaced apart from the first magnetic body and disposed to face the first magnetic body; and a third magnetic body integrally formed with the first magnetic body and the second magnetic body and interposed between the low runner and the fixed contact terminal.

20. The circuit breaking unit of claim 19, wherein the first magnetic body, the second magnetic body, and the third magnetic body are formed by stacking magnetic bodies.

21. The circuit breaking unit of claim 20, wherein the first magnetic body and the second magnetic body are configured to form an induced magnetic field by the generated arc, and wherein the induced magnetic field is formed so that the generated arc is subjected to an electromagnetic force upward.

22. The circuit breaking unit of claim 19, wherein the magnet unit is disposed above the third magnetic body.

23. A air circuit breaker, comprising:

a cover;

an arc extinguishing unit disposed within the cover and comprising a plurality of side plates and a grid coupled between the side plates; and a circuit breaking unit disposed adjacent to the arc extinguishing unit, wherein the circuit breaking unit comprises:

a fixed contact;

a movable contact that is in contact with or spaced apart from the fixed contact;

a protruding contact spaced apart from the movable contact;

a fixed contact terminal having the fixed contact disposed at a lower end thereof and extending upward;

a movable contact terminal on which the movable contact and the protruding contact are disposed and configured such that the movable contact moves in a direction toward the fixed contact or in a direction away from the fixed contact;

a low runner disposed extending upward from the fixed contact, one end thereof coupled to the fixed contact terminal, and the other end thereof spaced apart from the fixed contact terminal;

a holder disposed between the low runner and the fixed contact terminal, extending away from the fixed contact terminal, extending toward the movable contact, having a space formed therein, and protruding from both sides of the low runner; and a U magnetic body stored in an inner space of the holder and made of a permanent magnet, wherein the holder is formed to extend to both sides of the low runner so that when an arc is generated in an arc-generation area, a pressure applied to the arc is increased as the arc-generation area is reduced by an air gap formed between the protruding contact and the holder, wherein the U magnetic body comprises a magnet unit disposed to be extending from the fixed contact terminal between the protruding contact and an arc extinguishing unit disposed above the protruding contact, and disposed to face each other.

24. The air circuit breaker of claim 23, wherein the grid comprises a grid leg that extends from at least one end in a width direction and extends downward to surround an outside of the holder.

25. A air circuit breaker, comprising:

a cover;

an arc extinguishing unit disposed within the cover and comprising a plurality of side plates and a grid coupled between the side plates; and a circuit breaking unit disposed adjacent to the arc extinguishing unit, wherein the circuit breaking unit comprises:

a fixed contact;

a movable contact that is in contact with or spaced apart from the fixed contact;

a protruding contact spaced apart from the movable contact;

a fixed contact terminal having the fixed contact disposed at a lower end thereof and extending upward;

a movable contact terminal on which the movable contact is disposed and configured such that the movable contact moves in a direction toward the fixed contact or in a direction away from the fixed contact;

a low runner disposed extending in a direction away from the fixed contact, one end thereof coupled to the fixed contact terminal, and the other end thereof spaced apart from the fixed contact terminal; and a magnet unit disposed between the low runner and the fixed contact terminal and forming a magnetic field so that a generated arc is subjected to an electromagnetic force toward the arc extinguishing unit, wherein the magnet unit comprises:

a first surface magnetized to a N pole; and a second surface magnetized to a S pole, and wherein one of the first surface and the second surface of the magnet unit is disposed in a direction toward the fixed contact, and the other surface is disposed in a direction opposite to the one surface.

26. The air circuit breaker of claim 25, wherein the magnet unit is disposed to overlap at least a portion of the grid.

27. A circuit breaking unit, comprising:

a fixed contact;

a movable contact that is in contact with or spaced apart from the fixed contact;

a protruding contact spaced apart from the movable contact;

a fixed contact terminal having the fixed contact disposed at a lower end thereof and extending upward;

a movable contact terminal on which the movable contact is disposed and configured such that the movable contact moves in a direction toward the fixed contact or in a direction away from the fixed contact;

a low runner disposed extending in a direction away from the fixed contact, one end thereof coupled to the fixed contact terminal, and the other end thereof spaced apart from the fixed contact terminal;

a holder disposed between the low runner and the fixed contact terminal, extending away from the fixed contact terminal, extending toward the movable contact, having a space formed therein, and protruding from both sides of the low runner; and a U magnetic body stored in an inner space of the holder and made of a ferromagnetic body, wherein the holder is formed to extend to both sides of the low runner so that when an arc is generated in an arc-generation area, a pressure applied to the arc is increased as the arc-generation area is reduced by an air gap formed between the protruding contact and the holder, and wherein the U magnetic body comprises a plurality of magnetic bodies disposed to be extending from the fixed contact terminal between the protruding contact and an arc extinguishing unit disposed above the protruding contact.

28. The circuit breaking unit of claim 27, wherein the U magnetic body comprises:

a first magnetic body disposed to be extending from the fixed contact terminal between the protruding contact and the arc extinguishing unit;

a second magnetic body spaced apart from the first magnetic body and disposed to face the first magnetic body; and a third magnetic body integrally formed with the first magnetic body and the second magnetic body and interposed between the low runner and the fixed contact terminal.

29. The circuit breaking unit of claim 28, wherein the first magnetic body, the second magnetic body, and the third magnetic body are formed by stacking magnetic bodies.

30. The circuit breaking unit of claim 29, wherein the first magnetic body and the second magnetic body are configured to form an induced magnetic field by a generated arc, and wherein the induced magnetic field is formed so that a generated arc is subjected to an electromagnetic force upward.

* * * * *